US012525226B2

(12) United States Patent
Thummaluri et al.

(10) Patent No.: US 12,525,226 B2
(45) Date of Patent: Jan. 13, 2026

(54) LATENCY REDUCTION FOR MULTI-STAGE SPEECH RECOGNITION

(71) Applicant: QUALCOMM Incorporated, San Diego, CA (US)

(72) Inventors: Uday Reddy Thummaluri, Nalgonda (IN); Prapulla Vuppu, Secunderabad (IN); Sachin Raghunath Abdagire, San Diego, CA (US); Ritesh Garg, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 420 days.

(21) Appl. No.: 18/167,763

(22) Filed: Feb. 10, 2023

(65) Prior Publication Data

US 2024/0274127 A1    Aug. 15, 2024

(51) Int. Cl.
*G10L 15/16* (2006.01)
*G10L 15/08* (2006.01)
*G10L 15/18* (2013.01)
*G10L 15/22* (2006.01)

(52) U.S. Cl.
CPC ............ *G10L 15/083* (2013.01); *G10L 15/16* (2013.01); *G10L 15/1815* (2013.01); *G10L 15/22* (2013.01); *G10L 2015/088* (2013.01); *G10L 2015/228* (2013.01)

(58) Field of Classification Search
None
See application file for complete search history.

(56) References Cited

U.S. PATENT DOCUMENTS

| | | | |
|---|---|---|---|
| 10,685,652 B1* | 6/2020 | Cherukuri | G06F 3/167 |
| 10,755,731 B2* | 8/2020 | Suzuki | G10L 15/04 |
| 11,205,420 B1* | 12/2021 | Fu | G06N 3/04 |
| 11,259,117 B1* | 2/2022 | Chelliah | G10L 21/0216 |
| 11,836,416 B2* | 12/2023 | Wahlberg | G06F 3/167 |
| 11,948,569 B2* | 4/2024 | Choi | G10L 15/22 |

(Continued)

OTHER PUBLICATIONS

International Search Report and Written Opinion—PCT/US2024/013593—ISA/EPO—Apr. 23, 2024.

(Continued)

*Primary Examiner* — Seong-Ah A Shin
(74) *Attorney, Agent, or Firm* — QUALCOMM Incorporated; Espartaco Diaz Hidalgo

(57) ABSTRACT

Systems and techniques are provided for processing one or more audio samples. For example, a process can include receiving one or more audio samples in a first audio frame and determining, using a first keyword detection model, a first keyword detection score for the first audio frame. One or more audio samples can be received in additional audio frames. Based on the first keyword detection score exceeding a first threshold, the first keyword detection model can be used to determine a keyword detection score for each audio frame of the additional audio frames. The respective keyword detection score for each audio frame of the additional audio frames can be compared to a second threshold that is greater than the first threshold. Based on the respective keyword detection score exceeding the second threshold, using a second keyword detection model to process the first audio frame and the additional audio frames can be skipped.

30 Claims, 9 Drawing Sheets

(56) References Cited

U.S. PATENT DOCUMENTS

| | | | | |
|---|---|---|---|---|
| 2002/0016711 | A1* | 2/2002 | Manjunath | G10L 19/125 |
| | | | | 704/E19.036 |
| 2005/0177364 | A1* | 8/2005 | Jelinek | G10L 19/20 |
| | | | | 704/E19.044 |
| 2006/0111897 | A1* | 5/2006 | Gemello | G10L 15/16 |
| | | | | 704/E15.017 |
| 2016/0071516 | A1* | 3/2016 | Lee | G10L 15/30 |
| | | | | 704/251 |
| 2017/0162192 | A1* | 6/2017 | Clark | G10L 25/84 |
| 2018/0158470 | A1* | 6/2018 | Zhu | G10L 25/81 |
| 2019/0251963 | A1* | 8/2019 | Li | G06N 3/08 |
| 2020/0312336 | A1* | 10/2020 | Kang | G06N 3/08 |
| 2020/0327197 | A1* | 10/2020 | Bhowal | G06N 5/041 |
| 2021/0142802 | A1* | 5/2021 | Furuyama | H04R 3/005 |
| 2021/0398551 | A1* | 12/2021 | Nandy | G10L 15/16 |
| 2023/0134400 | A1* | 5/2023 | Niknazar | G10L 15/26 |
| | | | | 704/233 |
| 2023/0419962 | A1* | 12/2023 | Kim | G10L 15/22 |

OTHER PUBLICATIONS

Yang Z., et al., "CaTT-KWS: A Multi-stage Customized Keyword Spotting Framework based on Cascaded Transducer-Transformer", arXiv:2207.01267v1 [cs.SD] Cornell University Library, 201 Olin Library Cornell University Ithaca, NY 14853, Jul. 4, 2022, XP091262214, 5 Pages, Figure 1 Section 2.

* cited by examiner

LATENCY REDUCTION FOR MULTI-STAGE SPEECH RECOGNITION

FIELD

This application is related to speech recognition. For example, systems and techniques are described for reducing latency in performing multi-stage speech recognition based on using detection score information to skip one or more speech recognition stages.

BACKGROUND

Electronic devices such as smartphones, tablet computers, wearable electronic devices, smart TVs, and the like are becoming increasingly popular among consumers. These devices can provide voice and/or data communication functionalities over wireless or wired networks. In addition, such electronic devices can include other features that provide a variety of functions designed to enhance user convenience. Electronic devices can include a speech recognition function for receiving voice commands from a user. Such a function allows an electronic device to perform a function associated with a voice command (e.g., such as via a keyword) when the voice command from a user is received and recognized. For example, the electronic device may activate a voice assistant application, play an audio file, or take a picture in response to the voice command from the user.

Speech recognition can be implemented as an "always-on" function in electronic devices in order to maximize its utility. These always-on functions require always-on software and/or hardware resources, which in turn lead to always-on power usage. Mobile electronic devices, internet of things (IoT) devices, and the like are particularly sensitive to such always-on power demands as they reduce battery life and consume other finite resources of the system, such as processing capacity.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for processing one or more audio samples. According to at least one illustrative example, a method for processing one or more audio samples is provided. The method may include: receiving one or more audio samples in a first audio frame; determining using a first keyword detection model, a first keyword detection score for the first audio frame; receiving one or more audio samples in additional audio frames; determining, using the first keyword detection model based on the first keyword detection score exceeding a first threshold, a respective keyword detection score for each audio frame of the additional audio frames; comparing each respective keyword detection score for each audio frame of the additional audio frames to a second threshold, wherein the second threshold is greater than the first threshold; and based on each respective keyword detection score exceeding the second threshold, skipping using a second keyword detection model to process the one or more audio samples in the additional audio frames.

In another example, an apparatus for processing one or more audio samples is provided that includes at least one memory and at least one processor coupled to the at least one memory. The at least one processor is configured to and can: receive one or more audio samples in a first audio frame; determine, using a first keyword detection model, a first keyword detection score for the first audio frame; receive one or more audio samples in additional audio frames; determine, using the first keyword detection model based on the first keyword detection score exceeding a first threshold, a respective keyword detection score for each audio frame of the additional audio frames; compare each respective keyword detection score for each audio frame of the additional audio frames to a second threshold, wherein the second threshold is greater than the first threshold; and based on each respective keyword detection score exceeding the second threshold, skip using a second keyword detection model to process the one or more audio samples in the additional audio frames.

In another example, a non-transitory computer-readable medium of an apparatus is provided that has stored thereon instructions that, when executed by one or more processors, cause the one or more processors to: receive one or more audio samples in a first audio frame; determine, using a first keyword detection model, a first keyword detection score for the first audio frame; receive one or more audio samples in additional audio frames; determine, using the first keyword detection model based on the first keyword detection score exceeding a first threshold, a respective keyword detection score for each audio frame of the additional audio frames; compare each respective keyword detection score for each audio frame of the additional audio frames to a second threshold, wherein the second threshold is greater than the first threshold; and based on each respective keyword detection score exceeding the second threshold, skip using a second keyword detection model to process the one or more audio samples in the additional audio frames.

In another example, an apparatus for processing one or more audio samples is provided. The apparatus includes: means for receiving one or more audio samples in a first audio frame; means for determining using a first keyword detection model, a first keyword detection score for the first audio frame; means for receiving one or more audio samples in additional audio frames; means for determining, using the first keyword detection model based on the first keyword detection score exceeding a first threshold, a respective keyword detection score for each audio frame of the additional audio frames; means for comparing each respective keyword detection score for each audio frame of the additional audio frames to a second threshold, wherein the second threshold is greater than the first threshold; and based on each respective keyword detection score exceeding the second threshold, means for skipping using a second keyword detection model to process the one or more audio samples in the additional audio frames.

In some aspects, one or more of the apparatuses described herein is, is part of, and/or includes an extended reality (XR) device or system (e.g., a virtual reality (VR) device, an augmented reality (AR) device, or a mixed reality (MR) device), a mobile device (e.g., a mobile telephone or other mobile device), a wearable device, a wireless communication device, a camera, a personal computer, a laptop computer, a vehicle or a computing device or component of a vehicle, a server computer or server device (e.g., an edge or cloud-based server, a personal computer acting as a server device, a mobile device such as a mobile phone acting as a server device, an XR device acting as a server device, a vehicle acting as a server device, a network router, or other device acting as a server device), another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor.

The above-described aspects relating to any of the methods, apparatuses, and computer-readable media can be used individually or in any suitable combination.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Examples of various implementations are described in detail below with reference to the following figures.

DETAILED DESCRIPTION

Figure 1:
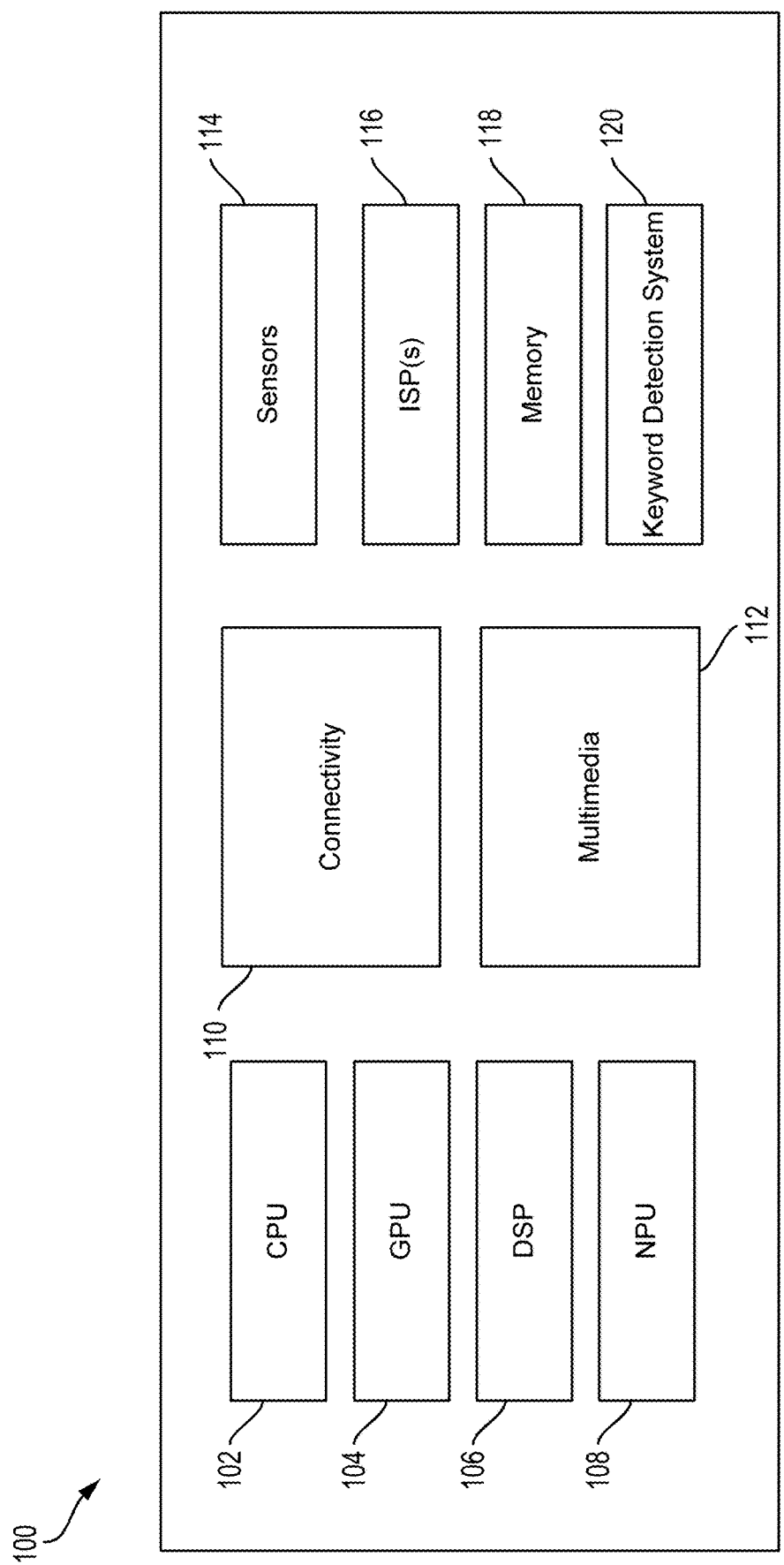
FIG. 1 is a block diagram illustrating an example speech recognition system, in accordance with some examples.

Certain aspects and examples of the disclosure are provided below. Some of these aspects and examples may be applied independently and some of them may be applied in combination as would be apparent to those of skill in the art. In the following description, for the purposes of explanation, specific details are set forth in order to provide a thorough understanding of aspects and examples of the application. However, it will be apparent that various aspects and examples may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

Voice recognition generally refers to the discrimination of a human voice by an electronic device in order to perform some function. One type of voice recognition may include keyword detection (e.g., wake word detection). Keyword detection may refer to a technique where a device detects and responds to certain words. For example, many consumer electronic devices may use keyword detection to recognize specific key words to perform certain actions, such as to "wake" a device, to query a device, and/or to cause the device to perform various other functions. Voice recognition can also be used in more complex functionalities, such as "far field" voice recognition (e.g., from a mobile device placed across a room), user identity verification (e.g., by voice signature), voice recognition during other audio output (e.g., detecting a voice command while playing back music on a device or detecting an interrupting command while a smart assistant is speaking), and voice interaction in complex noise environments, such as within moving vehicles. These are just a few examples, and many others are possible.

Voice recognition, like various other processing tasks on electronic devices, requires power and dedicated hardware and/or software to function. Further, voice recognition may be implemented as an "always-on" function (e.g., where audio is continuously monitored for key word detection) to maximize its utility to users of electronic devices with voice recognition functionality. For devices that are plugged in, the power usage of always-on voice recognition functionality is primarily an efficiency consideration, but for power sensitive devices (e.g., battery powered devices, mobile electronic devices, IoT devices, and the like) with always-on voice recognition functionality, power usage may be of more concern. For example, power use from always-on functions can limit the run-time of such devices and reduce capacity for other system processing requirements.

Voice recognition can include voice activity detection. For example, voice activity detection can refer to the detection of a human voice by a computing device in order to perform some function. For instance, keyword detection (e.g., also referred to as keyword recognition and/or keyword spotting (KWS)) is a task of detecting one or more keyword in an audio signal (e.g., an audio signal including human speech or spoken words). For example, keyword detection can be used to distinguish an activation phrase or a specific command from other speech and noise in an audio signal. In some cases, keyword detection systems can target or be utilized by edge devices such as mobile phones and smart speakers. Detected keywords can include single words, compound words, phrases including multiple words, etc. In some cases, keyword detection can be performed based on a set of pre-determined keywords and/or a set of user-defined keywords. In some cases, user-defined keywords can include one or more adaptations, adjustments, etc., that are determined based on specific characteristics of a given user's voice or speech.

Keyword detection can be performed for one or more audio data inputs (e.g., also referred to herein as "audio data," "audio signals," and/or "audio samples"). For instance, an audio sample provided to a keyword detection system can be a streaming audio signal. In some examples, keyword detection can be performed for the streaming audio signal in real-time. A streaming audio signal can be recorded by or obtained from a microphone associated with a computing device. Keyword detection can be performed locally or remotely. For example, keyword detection can be performed locally using one or more processors of the same computing device that collects or obtains the streaming audio signal. In some examples, keyword detection can be performed remotely by transmitting the streaming audio signal (or a representation thereof) from the local computing device to a remote computing device (e.g., the local computing device records an audio signal but offloads keyword detection processing tasks to a remote computing device). Performing keyword locally can result in a lower total latency or compute time but a decreased accuracy. Performing keyword remotely can result in a higher latency but an increased accuracy.

For example, local computing devices (e.g., smartphones) often have less computational power than remote computing devices (e.g., cloud computing systems) and therefore may generate keyword detection results with a lower accuracy or overall performance, particularly when subject to the time constraint associated with providing keyword detection results in real-time or near real-time. For example, local computing devices might implement keyword detection models with lower complexity than those implemented on remote computing devices in order to provide real-time keyword detection results. Lower accuracy keyword detection results can include false positives (e.g., identifying a keyword that is not actually present), false negatives (e.g., failing to identify a keyword that is present), and classification errors (e.g., identifying a first keyword as some other keyword).

However, performing keyword detection remotely can introduce a communication latency that may offset the accuracy gains associated with remote keyword detection. For example, remote keyword detection can introduce latency along the communication path from the local computing device to the remote computing device (e.g., the time to transmit the streaming audio signal or a representation thereof to the remote computing device) and along the return communication path from the remote computing device to the local computing device (e.g., the time to transmit the keyword detection results from the remote computing device back to the local computing device).

In some cases, keyword detection can be performed using multiple stages. For instance, multiple stage keyword detection can be used to minimize power consumption associated with performing keyword detection on a power sensitive device (e.g., to minimize power consumption associated with always-on keyword detection performed by a battery powered device such as a smartphone or other mobile computing device). In multiple stage keyword detection, one or more stages can implement a low complexity and low latency keyword detection model and one or more subsequent stages can implement a higher complexity keyword detection model. For example, multi-stage keyword detection can be performed as a two-stage keyword detection. In such an example, a first stage keyword detection model can be a low complexity and low latency keyword detection model. Based on the first stage generating a keyword detection output (e.g., a keyword detection output having a confidence greater than or equal to a first threshold), the second stage keyword detection model can be activated and used to process the same audio sample (e.g., the same audio sample that triggered the detection output of the first stage).

A second stage keyword detection model can be provided as a relatively high complexity keyword detection model (e.g., with the first stage keyword detection model provided as a relatively low complexity keyword detection model). The second stage keyword detection model can be more performant than the first stage keyword detection model. The second stage keyword detection model can be used to provide a double confirmation of a keyword detection (e.g., by validating or confirming the keyword detection of the first stage) or to reject the first stage keyword detection as a false positive (e.g., invalidating the keyword detection of the first stage). However, performing multiple stages of keyword detection and/or using multiple different keyword detection models can also be seen to increase an end-to-end system latency of a keyword detection system.

As mentioned above, in some examples, keyword detection is often performed in real-time (or approximately real-time) to allow user interaction with one or more computing devices. The lag between the time a user speaks a keyword (e.g., an activation phrase or specific command) and the time that the computing device provides a corresponding response or action can be an important factor in the user's willingness to utilize spoken commands (e.g., spoken keywords). In some cases, a lag of multiple seconds may frustrate users or otherwise dissuade them from using spoken keywords. As such, there is a need for improved keyword detection performance in local and/or remote keyword detection implementations, as both local and remote keyword detection implementations are often time-bound processes.

Systems, apparatuses, methods (also referred to as processes), and computer-readable media (collectively referred to herein as "systems and techniques") are described herein for providing a keyword detection system that can dynamically skip one or more keyword detection stages based on detection score information determined for a first keyword detection stage. In some cases, the detection score information can be detection score information. In some examples, the systems and techniques can skip some (or all) of a set of one or more downstream keyword detection stages that are subsequent to a first keyword detection stage, based on a determination that a detection score of the first keyword detection stage is greater than or equal to one or more threshold values. In some cases, skipping one or more keyword detection stages after the first keyword detection stage can reduce an end-to-end latency associated with a keyword detection system. Skipping the one or more keyword detection stages after the first keyword detection stage can additionally reduce a power consumption associated with the keyword detection system (e.g., can reduce a power consumption associated with performing the keyword detection for one or more input audio samples).

In some examples, the systems and techniques can dynamically skip one or more keyword detection stages based on analyzing respective detection score information associated with the first keyword detection stage and the one or more additional keyword detection stages (e.g., the downstream keyword detection stages subsequent to the first keyword detection stage). In some aspects, one or more threshold values can be determined based on analyzing the respective detection score information associated with different keyword detection stages of a multi-stage keyword detection system, as will be described in greater depth below.

In some cases, the systems and techniques can dynamically skip one or more keyword detection stages based on performing keyword detection for one or more hangover frames of an audio signal. For instance, a hangover frame can refer to an audio frame that occurs after a keyword detection score has exceeded a pre-determined threshold. For example, a first keyword detection stage can be associated with a first detection threshold. The first keyword detection stage can generate a keyword detection output indicative of a detected keyword when a detection score of a current audio frame (e.g., included in a plurality of audio frames of an audio sample) is greater than the first detection threshold. The audio frames that occur or are otherwise obtained after the current audio frame has a detection score that exceeds the first detection threshold can be referred to as "hangover" frames. In some aspects, the systems and techniques can determine detection score information for some (or all) of the hangover frames after the first detection threshold of the first keyword detection stage has been exceeded. The detection score information determined for the hangover frames can be analyzed against an additional threshold value to determine whether additional keyword detection stages (e.g., such as the second keyword detection stage of a two-stage keyword detection system) can be skipped. In one illustrative example, the additional threshold value can be determined such that, for the determined threshold value, the skipped keyword detection stage would make the same keyword detection decision as the first keyword detection stage.

In some aspects, the systems and techniques can implement a voice activity detection (VAD) and/or audio context detection (ACD) machine learning model to determine additional classification information of an input audio sample that is provided to the multi-stage keyword detection system. For instance, a VAD or ACD model can be used to classify the input audio sample (or audio frames thereof) as speech or noise (or other non-speech audio signal). The speech or noise classification information can be provided as an additional input to a multi-stage keyword detection system and used to dynamically determine whether one or more additional keyword detection stages can be skipped. For example, speech or noise classification information can be used in combination with a first stage detection score information (e.g., as described above) to jointly determine whether a second stage of the multi-stage keyword detection system can be dynamically skipped.

By skipping one or more keyword detection stages after the first keyword detection stage, end-to-end latency associated with a keyword detection system can be reduced. Skipping the one or more keyword detection stages after the first keyword detection stage can additionally reduce a power consumption associated with the keyword detection system (e.g., can reduce a power consumption associated with performing the keyword detection for one or more input audio samples).

Various aspects of the present disclosure will be described with respect to the figures.

FIG. 1 illustrates an example implementation of a system-on-a-chip (SoC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SoC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures, speech, and/or other interactive user action(s) or input(s). In one implementation, the NPU 108 is implemented in the CPU 102, DSP 106, and/or GPU 104. The SoC 100 may also include a sensor processor 114, image signal processors (ISPs) 116, and/or a keyword detection system 120. In some examples, the sensor processor 114 can be associated with or connected to one or more sensors for providing sensor input(s) to sensor processor 114. For example, the one or more sensors and the sensor processor 114 can be provided in, coupled to, or otherwise associated with a same computing device.

In some examples, the one or more sensors can include one or more microphones for receiving sound (e.g., an audio input), including sound or audio inputs that can be used to perform keyword spotting (KWS), which may be considered a specific type of keyword detection. In some cases, the sound or audio input received by the one or more microphones (and/or other sensors) may be digitized into data packets for analysis and/or transmission. The audio input may include ambient sounds in the vicinity of a computing device associated with the SoC 100 and/or may include speech from a user of the computing device associated with the SoC 100. In some cases, a computing device associated with the SoC 100 can additionally, or alternatively, be communicatively coupled to one or more peripheral devices (not shown) and/or configured to communicate with one or more remote computing devices or external resources, for example using a wireless transceiver and a communication network, such as a cellular communication network.

SoC 100, DSP 106, NPU 108 and/or keyword detection system 120 may be configured to perform audio signal processing. For example, the keyword detection system 120 may be configured to perform steps for KWS. As another example, one or more portions of the steps, such as feature generation, for voice KWS may be performed by the keyword detection system 120 while the DSP 106/NPU 108 performs other steps, such as steps using one or more machine learning networks and/or machine learning techniques according to aspects of the present disclosure and as described herein.

Figure 2:
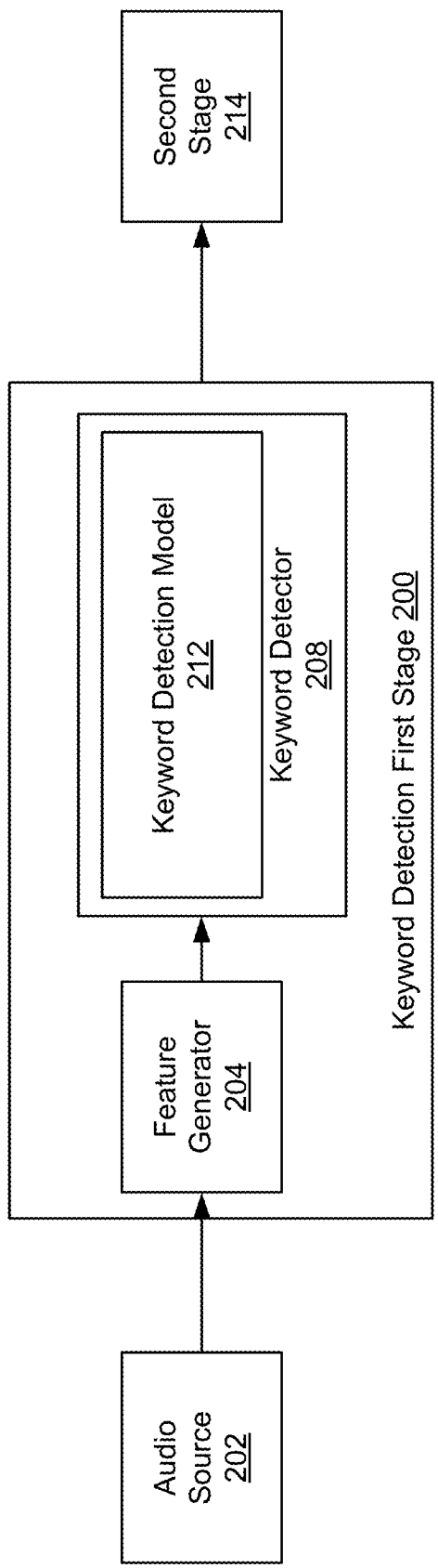
FIG. 2 is a block diagram illustrating an example keyword detection system, in accordance with some examples.

FIG. 2 depicts an example keyword detection first stage 200, in accordance with aspects of the present disclosure. Keyword detection first stage 200 receives audio signals (e.g., pulse-code modulation (PCM) audio data from an analog microphone, pulse density modulation (PDM) high definition audio from a digital microphone, and the like) from an audio source 202 in an electronic system. For example, the audio signals could be generated by one or more microphones of an electronic device, such as a mobile electronic device, smart home device, internet of things (IoT) device, or other edge processing device. In some cases, the audio signal may be received substantially in real time.

In some cases, certain devices, such as relatively low-power (e.g., battery operated) devices may include a two-stage speech recognition system wherein a first keyword detection stage (e.g., the first keyword detection stage 200) generates a keyword detection output that may be used to activate a second keyword detection stage (e.g., second keyword detection stage 214). In multiple stage keyword detection, one or more stages can implement a low complexity and low latency keyword detection model and one or more subsequent stages can implement a higher complexity keyword detection model.

For instance, a model associated with the first keyword detection stage 200 can be a low complexity and low latency keyword detection model. Based on the first stage 200 generating a keyword detection output (e.g., a keyword detection output having a detection score greater than or equal to a first threshold), a model associated with the second keyword detection stage 214 can be activated and used to process the same audio sample (e.g., the same audio sample that triggered the detection output of the first stage 200). The relatively high complexity and/or more performant second stage keyword detection model can be used to provide a double confirmation of a keyword detection (e.g., by validating or confirming the keyword detection of the first stage) or to reject the first stage keyword detection as a false positive (e.g., invalidating the keyword detection of the first stage).

In some cases, the keyword detection first stage 200 may be implemented using a relatively lower-powered circuit such as a DSP, codec circuit, etc. When a keyword is detected, a second stage 214 may be activated which may, for example, handle more complex tasks, such as more freeform word recognition, detecting commands, performing tasks, etc. In some cases, the second stage may be performed on a relatively higher-powered circuit, such as a processor, GPU, ML/AI processor, etc.

As illustrated in FIG. 2, received audio samples (e.g., audio samples from audio source 202) are processed by a feature generator 204 of the keyword detection first stage 200. Feature generator 204 may be, for example, a hardware-implemented Fourier transformation, such as a fast Fourier transformation (FFT) function or circuit. A Fourier transform is generally a function for deconstructing a time domain representation of a signal, such as the received audio signals, into a frequency domain representation. The frequency domain representation may include voltages or powers present at varying frequencies in the received audio signals. In some cases, the feature generator 204 may generate a set of features, such as a feature vector, based on these representations. This set of features may be output to a keyword detector 208. An example of feature generator 204 is described in more detail with respect to FIG. 3. Notably, other or additional forms of feature generation may be used in other aspects and examples.

Keyword detector 208 may use a keyword detection model 212 to determine whether the received audio signal includes portions of a keyword. In some cases, the keyword detector 208 may accept, as input, tens to hundreds of audio frames per second and the keyword detector 208 may attempt to detect parts of the keyword in an audio signal. In some cases, the keyword detection model 212 of keyword detector 208 may be a part of a multi-stage speech recognition system.

After the keyword detector 208 determines that a keyword was detected in the received audio signal, the keyword detector 208 generates a signal for a second stage 214. For example, a detected keyword may cause an application to launch, or another part of the electronic device to wake up (e.g., a screen, other processor, or other sensor), a query to be run locally or at a remote data service, additional speech recognition processing, and the like. In some aspects, the second stage 214 may receive an indication that keyword has been detected, while in other aspects and/or examples, second stage 214 may receive additional information, such as information specific to the detected keyword, such as one or more detected keywords in the voice activity. Notably, there may be additional functions (not shown) between keyword detector 208 and second stage 214, such as additional stages of keyword detection or analysis.

Figure 3:
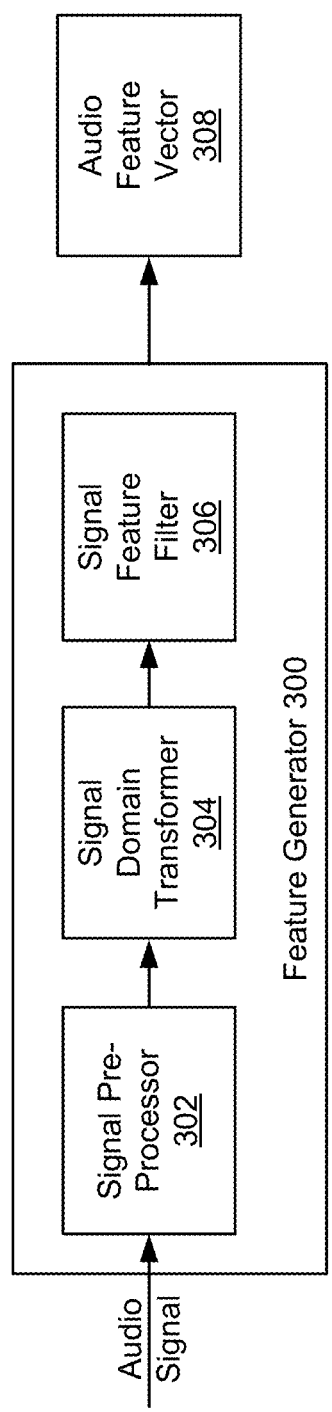
FIG. 3 is a block diagram illustrating an example feature generator, in accordance with some examples.

FIG. 3 depicts an example of a feature generator 300, such as feature generator 204 of FIG. 2, in accordance with aspects of the present disclosure. It should be understood that many techniques may be used to generate feature vectors for an audio and that feature generator 300 is just a single example of a technique that may be used to generate feature vectors.

Feature generator 300 receives an audio signal at signal pre-processor 302. As above, the audio signal may be from an audio source, such as audio source 202, of an electronic device, such a microphone.

Signal pre-processor 302 may perform various pre-processing steps on the received audio signal. For example, signal pre-processor 302 may split the audio signal into parallel audio signals and delay one of the signals by a predetermined amount of time to prepare the audio signals for input into an FFT circuit.

As another example, signal pre-processor 302 may perform a windowing function, such as a Hamming, Hann, Blackman-Harris, Kaiser-Bessel window function, or other sine-based window function, which may improve the performance of further processing stages, such as signal domain transformer 304. Generally, a windowing (or window) function in may be used to reduce the amplitude of discontinuities at the boundaries of each finite sequence of received audio signal data to improve further processing.

As another example, signal pre-processor 302 may convert the audio signal data from parallel to serial, or vice versa, for further processing. The pre-processed audio signal from the signal pre-processor 302 may be provided to signal domain transformer 304, which may transform the pre-processed audio signal from a first domain into a second domain, such as from a time domain into a frequency domain.

In some aspects, signal domain transformer 304 implements a Fourier transform, such as a fast Fourier transform (FFT). For example, in some cases, the fast Fourier transform may be a 16-band (or bin, channel, or point) FFT, which generates a compact feature set that may be efficiency processed by a model. In some cases, a Fourier transform provides fine spectral domain information about the incoming audio signal as compared to conventional single channel processing, such as conventional hardware SNR threshold detection. The result of signal domain transformer 304 is a set of audio features, such as a set of voltages, powers, or energies per frequency band in the transformed data.

The set of audio features may then be provided to signal feature filter 306, which may reduce the size of or compress the feature set in the audio feature data. In some aspects, signal feature filter 306 may discard certain features from the audio feature set, such as symmetric or redundant features from multiple bands of a multi-band FFT. Discarding this data reduces the overall size of the data stream for further processing and may be referred to a compressing the data stream.

For example, in some cases, a 16-band FFT may include 8 symmetric or redundant bands of after the powers are squared because audio signals are real. Thus, signal feature filter 306 may filter out the redundant or symmetric band information and output an audio feature vector 308. In some cases, output of the signal feature filter may be compressed or otherwise processed prior to output as the audio feature vector 308.

The audio feature vector 308 may be provided to a keyword detector for processing by a keyword detection model, such as keyword detector 208 and keyword detection model 212 as shown in FIG. 2.

In some cases, the voice detection model, such as keyword detection model 212, may execute on SoC 100 and/or components thereof, such as the DSP 106 and/or the NPU 108 of FIG. 1. In some cases, the voice detection model may be a machine learning model or system.

Machine learning (ML) can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as speech analysis, audio signal analysis, image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multilayer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases. Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Figure 4A:
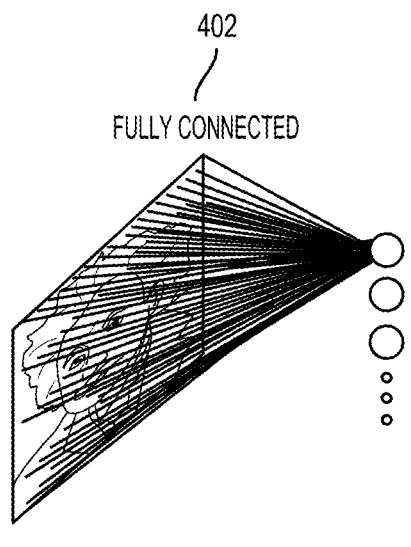
FIGS. 4A-4C are diagrams illustrating examples of neural networks, in accordance with some examples.
Figure 4B:
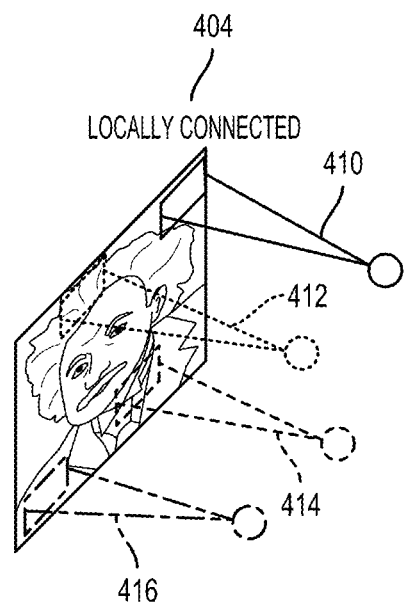
Figure 4C:
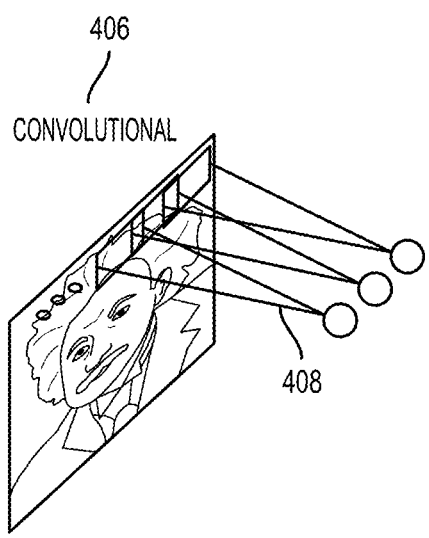

FIGS. 4A-4C illustrate example neural networks which may be used for keyword detection, in accordance with aspects of the present disclosure. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

In some cases, the connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, as the higher layer neurons in a given region may receive inputs that are tuned through training to the properties of a restricted portion of the total input to the network.

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 5:
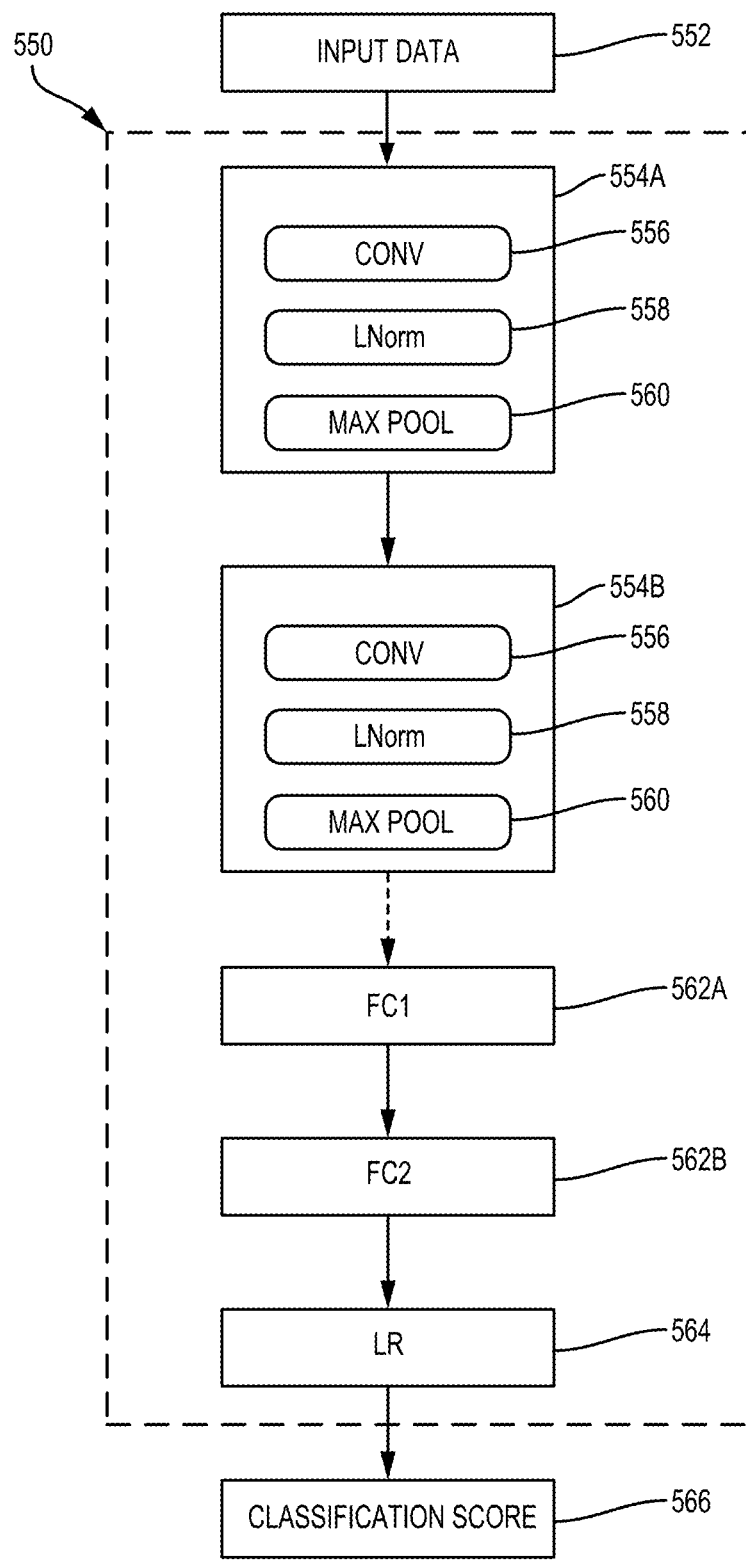
FIG. 5 is a block diagram illustrating an example of a deep convolutional network (DCN), in accordance with some examples.

FIG. 5 is a block diagram illustrating an example of a deep convolutional network (DCN) 550, in accordance with aspects of the present disclosure. The DCN 550 may include multiple different types of layers based on connectivity and weight sharing. As shown in FIG. 5, the DCN 550 includes the convolution blocks 554A, 554B. Each of the convolution blocks 554A, 554B may be configured with a convolution layer (CONV) 556, a normalization layer (LNorm) 558, and a max pooling layer (MAX POOL) 560.

The convolution layers 556 may include one or more convolutional filters, which may be applied to the input data 552 to generate a feature map. Although only two convolution blocks 554A, 554B are shown, the present disclosure is not so limiting, and instead, any number of convolution blocks (e.g., blocks 554A, 554B) may be included in the DCN 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In some examples, the parallel filter banks may be loaded on the DSP 106 or an ISP 116 of an SOC 100.

In addition, the DCN 550 may access other processing blocks that may be present on the SOC 100, such as sensor processor 114 and keyword detection system 120, dedicated, respectively, to sensors and navigation.

The deep convolutional network 550 may also include one or more fully connected layers, such as layer 562A (labeled "FC1") and layer 562B (labeled "FC2"). The DCN 550 may further include a logistic regression (LR) layer 564. Between each layer 556, 558, 560, 562A, 562B, 564 of the DCN 550 are weights (not shown) that are to be updated. The output of each of the layers (e.g., 556, 558, 560, 562A, 562B, 564) may serve as an input of a succeeding one of the layers (e.g., 556, 558, 560, 562A, 562B, 564) in the deep convolutional network 550 to learn hierarchical feature representations from input data 552 (e.g., images, audio, video, sensor data and/or other input data) supplied at the first of the convolution blocks 554A.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new input and a forward pass through the network may yield an output 422 that may be considered an inference or a prediction of the DCN.

The output of the DCN 550 is a classification score 566 for the input data 552. The classification score 566 may be a probability, or a set of probabilities, where the probability is the probability of the input data including a feature from a set of features the DCN 550 is trained to detect.

In some cases, a ML system or model may be used to analyze each audio frame to determine whether a voice command may be present. For keyword detection, the output of the ML network, such as the probability may be referred to as a frame score. This frame score indicates a likelihood that the frame includes one or more portions of a voice command, such as a keyword. As an example, where keyword detection responds to the keyword "hey device," a first audio frame may have an audio signal that includes sounds corresponding to "he." The ML network, should output a higher frame score for the first audio frame as compared to another audio frame which does not have an audio signal that includes sounds corresponding to parts of "hey device." While discussed in the context of a ML system herein, in some cases, a non-ML technique may be used to analyze audio frames to generate frame scores and determine whether a voice command may be present. For example, a Gaussian mixture model (GMM), hidden Markov model (HMM) (GMM-HMM), dynamic time warping (DTW), and/or other processes like phoneme likelihood estimation, Viterbi decoding, etc. using Gaussian acoustic models and/ or N-gram language models may be used. These non-ML techniques may also be skipped based on techniques discussed herein.

Generally, a ML system or model may be relatively complex and power intensive to execute, and it may be beneficial to reduce the use of the ML system or model to help reduce power consumption of a keyword detection system.

As noted previously, systems and techniques are described herein for providing a keyword detection system that can dynamically skip one or more keyword detection stages based on detection score information determined for a first keyword detection stage. For example, the systems and techniques can skip some (or all) of a set of one or more downstream keyword detection stages that are subsequent to a first keyword detection stage, based on a determination that a detection score of the first keyword detection stage is greater than or equal to one or more threshold values. In some cases, skipping one or more keyword detection stages after the first keyword detection stage can reduce an end-to-end latency associated with a keyword detection system. Skipping the one or more keyword detection stages after the first keyword detection stage can additionally reduce a power consumption associated with the keyword detection system (e.g., can reduce a power consumption associated with performing the keyword detection for one or more input audio samples).

Figure 6:
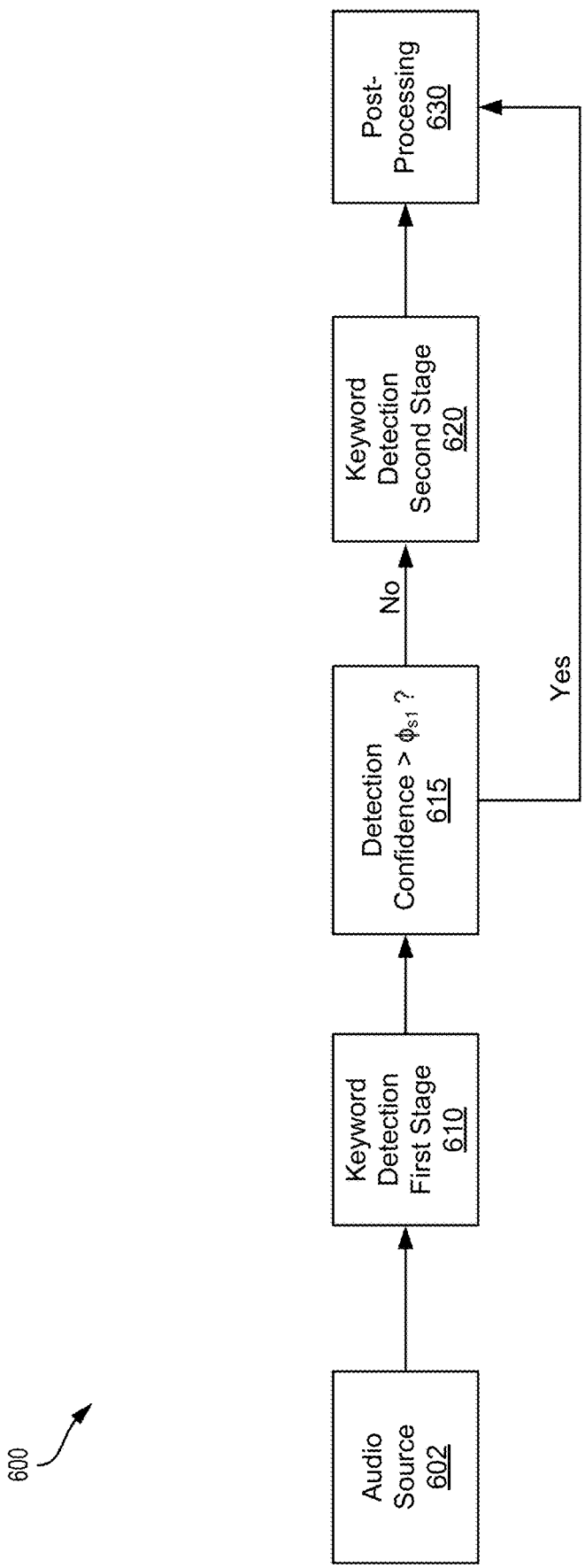
FIG. 6 is a block diagram illustrating an example keyword detection system using detection score information, in accordance with some examples.

FIG. 6 is a block diagram illustrating an example keyword detection system 600 for processing one or more audio samples using detection score information, in accordance with some examples. The keyword detection system 600 can be a multi-stage keyword detection system and can use detection score information to dynamically skip one or more keyword detection stages included in the multiple keyword detection stages. In some aspects, the keyword detection system 600 can be a two-stage keyword detection system and can include a first keyword detection stage 610 and a second keyword detection stage 620. In one illustrative example, the first keyword detection stage 610 can be the same as or similar to the first keyword detection stage 200 of FIG. 2 and/or the second keyword detection stage 620 can be the same as or similar to the second keyword detection stage 214 of FIG. 2.

The first keyword detection stage 610 can receive one or more audio samples from an audio source 602 (e.g., in a manner the same as or similar to that described previously above with respect to the first keyword detection stage 200 and the audio source 202 of FIG. 2). For instance, the first keyword detection stage 610 can receive as input PCM data obtained from a microphone.

The one or more audio samples obtained from audio source 602 can include a plurality of audio frames. Each audio frame of the plurality of audio frames can be processed using the first keyword detection stage 610. The first keyword detection stage 610 can generate as output keyword detection information associated with each audio frame of the plurality of audio frames. For instance, the output of the first keyword detection stage 610 can include or be indicative of keyword detection score information for each respective audio frame.

In some aspects, the keyword detection score information generated as output by the first keyword detection stage 610 can be a numerical value indicative of the keyword detection score (e.g., a confidence that a particular keyword is detected for the current audio frame). In one illustrative example, the first stage keyword detection score determined by the first keyword detection stage 610 can be compared to a first threshold value.

For instance, the first stage keyword detection score can be compared to a threshold $T_{s1}$ that is associated with the first keyword detection stage 610. The threshold $T_{s1}$ may be a pre-determined threshold, such as a pre-determined detection score threshold of a keyword detection model implemented by the first stage 610.

When the detection score generated as output by the first stage 610 is greater than the threshold $T_{s1}$, the multi-stage keyword detection system 600 can dynamically determine whether the current audio frame will be further processed using the second keyword detection stage 620 (e.g., which may implement a keyword detection model having a greater complexity and accuracy than the model of first stage 610) or whether the second keyword detection stage 620 may be skipped. In some examples, one or more audio frames (and/or other suitable audio data) can be provided to a post-processing stage 630. For example, the second keyword detection stage 620 can be skipped and audio data including at least the current audio frame can be provided to the post-processing stage 630. In some examples, the audio data can additionally, or alternatively, include one or more audio frames prior to the current audio frame and/or one or more audio frames subsequent to the current audio frame that are provided to the post-processing stage 630 based on skipping the second keyword detection stage 620. Providing the audio data comprising the one or more audio frames (e.g., as described above) to the post-processing stage 630 can correspond to a positive keyword detection determination, wherein the post-processing stage 630 performs one or more operations based on the detected presence of the keyword. For example, post-processing stage 630 can include one or more command streaming operations, one or more response operations, one or more audio context detection (ACD) operations, etc.

In some cases, the systems and techniques described herein can use context information to determine or obtain one or more (or all) of the detection score thresholds. For example, audio context information (e.g., including audio context and/or other information generated as output using ACD operations) can be used to obtain some (or all) of the detection score thresholds from a lookup table or other pre-determined information store. In one illustrative example, the detection score threshold values corresponding to the first threshold $T_{s1}$ and/or the threshold $\phi_{s1}$ can be obtained from a lookup table based on audio context information. In some aspects, the audio context information can be indicative of or associated with a particular context or environment in which the one or more audio samples (e.g., and/or the one or more audio frames including one or more audio samples) were obtained. For instance, audio context information can indicative that the audio samples or audio frames were obtained from a phone in pocket context, a running context, a driving context, a noisy environment context (e.g., at a sporting venue, in-vehicle or other road noise, etc.). In some aspects, the detection score threshold values associated with respective audio contexts and/or audio context information can be pre-determined. For instance, a lookup table of different detection score threshold values corresponding to different audio contexts can be pre-determined or otherwise generated offline from the audio keyword detection described herein. In some cases, the systems and techniques can use the pre-determined detection score threshold values based on real-time detection or determination of the audio context information. For instance, one or more ACD operations can determine, in real-time, an audio context information associated with one or more audio samples (e.g., an audio frame) and use the determined audio context information to obtain corresponding detection score threshold values from the pre-determined lookup table.

In one illustrative example, when the detection score output by first stage 610 is greater than the threshold $T_{s1}$, the multi-stage keyword detection system 600 can perform detection confidence analysis at a detection confidence analysis stage 615 to determine whether the second keyword detection stage 620 can be skipped. For example, the detection score output of the first stage 610 (e.g., the detection score determined for the current audio frame by the keyword detection model of the first stage 610) can be compared to a threshold $\phi_{s1}$. The threshold $\phi_{s1}$ can be a pre-determined threshold value, as will be described in greater depth below.

In some aspects, based on the detection score output of the first stage 610 exceeding the threshold $\phi_{s1}$, the keyword detection second stage 620 can be skipped and the current audio frame can be processed using the post-processing stage 630 (e.g., corresponding to the 'Yes' output shown in FIG. 6 between the detection confidence analysis stage 615 and the post-processing stage 630). Skipping the keyword detection second stage 620 can correspond to detecting a keyword for the current audio frame.

Based on the detection score output of the first stage 610 not exceeding the threshold $\phi_{s1}$, the keyword detection second stage 620 is not skipped, but is activated and used to further analyze the audio sample (e.g., corresponding to the 'No' output shown in FIG. 6 between the detection confidence analysis stage 615 and the keyword detection second stage 620). For example, the audio sample can include a current frame of audio data (e.g., corresponding to the frame at which the first stage keyword detection score output was last compared against the threshold $\phi_{s1}$) and can additionally include one or more previous frames of audio data prior to the current frame. The audio sample may additionally include one or more frames of subsequent audio data after the current frame. When the keyword detection second stage 620 is activated, the audio sample can be analyzed using a second keyword detection model implemented by the second stage 620. If a keyword detection output of the second stage 620 exceeds a detection score threshold associated with the second stage 620 (e.g., a second stage detection score threshold $T_{s2}$), the audio sample can then be provided to the post-processing stage 630. If the keyword detection output of the second stage 620 does not exceed the detection score threshold associated with the second stage 620 (e.g., does not exceed $T_{s2}$), then a keyword is not detected and the post-processing stage 630 is not utilized or otherwise activated.

In one illustrative example, the threshold $\phi_{s1}$ associated with the detection confidence analysis stage 615 can be different than the first stage detection score threshold $T_{s1}$ described above. For instance, the threshold $\phi_{s1}$ can be greater than the first stage detection score threshold $T_{s1}$. The threshold $\phi_{s1}$ can additionally be different than a second stage detection score threshold $T_{s2}$.

In one illustrative example, the multi-stage keyword detection system 600 can process an audio sample that includes a plurality of audio frames. Each audio frame can be provided as input to the first stage 610, which generates a first stage detection score as output. If the first stage detection score determined for a given audio frame (e.g., of the plurality of audio frames included in the audio sample) is less than the first stage detection score threshold $T_{s1}$, then the multi-stage keyword detection system 600 determines that a keyword is not detected for the current audio frame and waits for the next audio frame.

When the first stage detection score of first stage 610 is greater than the first stage detection score threshold $T_{s1}$, the multi-stage keyword detection system 600 can proceed to the detection confidence analysis stage 615. For instance, if an audio frame t has a first stage detection score $>T_{s1}$, the multi-stage keyword detection system 600 can proceed to the detection confidence analysis stage 615 and compare the first stage detection score for the audio frame t to the threshold $\phi_{s1}$.

In one illustrative example, if an audio frame t has a first stage detection score $>T_{s1}$, the multi-stage keyword detection system 600 can process one or more hangover audio frames (e.g., audio frames subsequent to the audio frame t) using the first stage 610 and the detection confidence analysis stage 615. For instance, once a given audio frame t is determined with a first stage detection score $>T_{s1}$, the subsequent audio frames t+1, t+2, . . . , (e.g., hangover audio frames) can be processed using the first stage 610 and the respective first stage detection score for each hangover audio frame can be compared to the threshold $\phi_{s1}$ using the detection confidence analysis stage 615. In some aspects, the detection confidence analysis stage 615 is activated for subsequent audio frames based on the current audio frame having a first stage detection score $>T_{s1}$.

Figure 7:
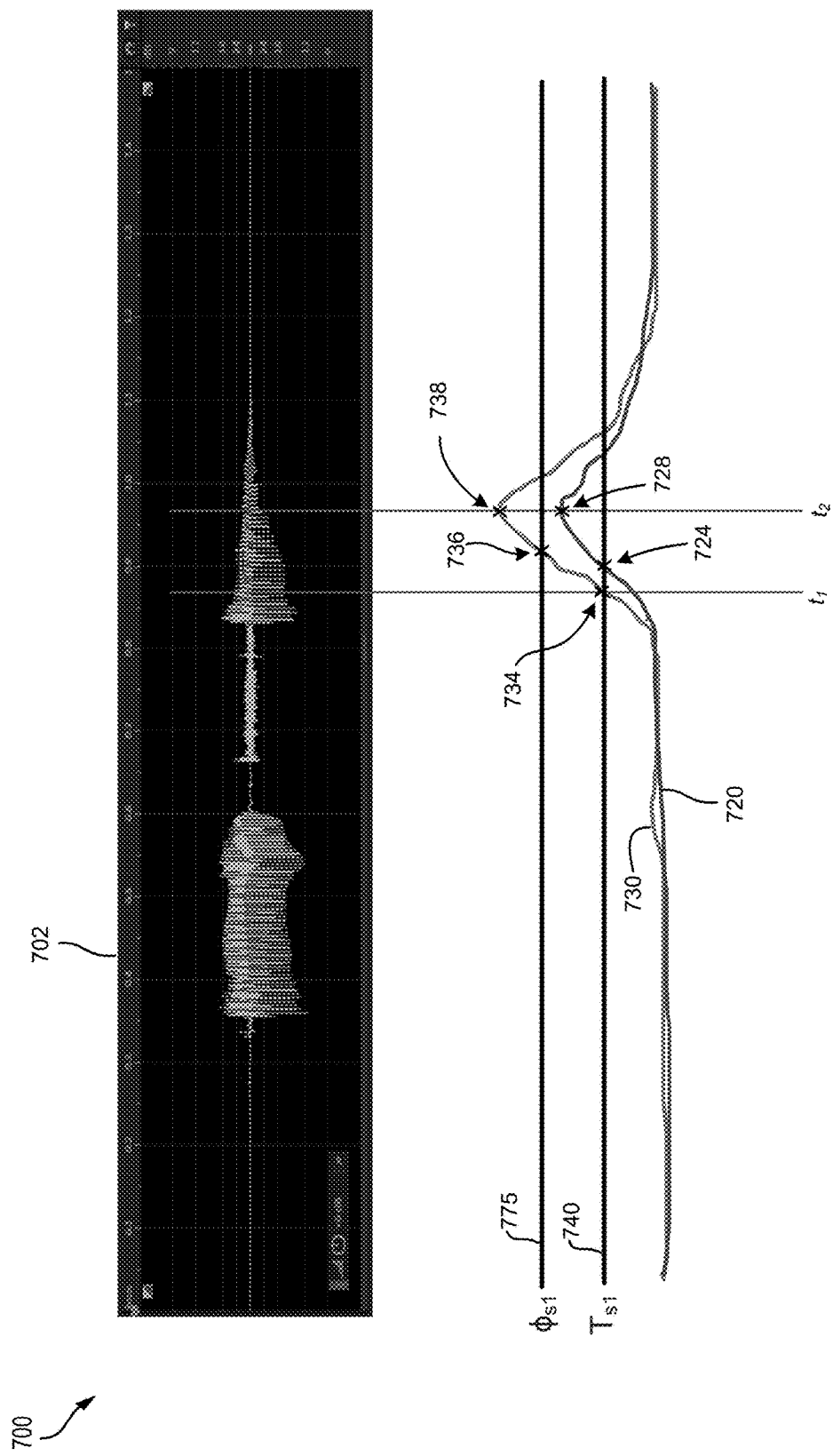
FIG. 7 is a diagram illustrating examples of keyword detection scores over time for an example audio sample, in accordance with some examples.

For instance, the detection confidence analysis stage 615 can be used for subsequent audio frames after an initial first stage detection score $>T_{s1}$ based on the possibility of the first stage detection score increasing for the subsequent (e.g., hangover) audio frames. FIG. 7 is a diagram 700 illustrating examples of keyword detection scores over time for an example audio sample 702, in accordance with some examples.

A first set of detection scores 720 and a second set of detection scores 730 are illustrated. The first set of detection scores 720 can correspond to a relatively low signal-to-noise ratio (SNR) audio sample (e.g., such as when the example audio sample 702 is obtained in a noisy background environment). The second set of detection scores 730 can correspond to a relatively high SNR audio sample (e.g., such as when the example audio sample 702 is obtained in a clean or quiet background environment).

The first set of detection scores 720 and the second set of detection scores 730 can be detection scores determined for the audio sample 702 using a first keyword detection stage of a multi-stage keyword detection system. For instance, the first and second sets of detection scores 720, 730 (respectively) can be detection scores determined using the first keyword detection stage 610 of FIG. 6 and/or the first keyword detection stage 200 of FIG. 2.

The horizontal axis of FIG. 7 can be a time axis. For instance, prior to time $t_1$, a keyword is not detected in either of the two sets of detection scores 720, 730. As illustrated, the first stage detection scores (e.g., the y-axis values) prior to time $t_1$ are less than the first stage detection score threshold $T_{s1}$ (e.g., indicated as the horizontal line 740). The threshold $\phi_{s1}$ (e.g., associated with the detection confidence analysis stage 615 of FIG. 6) is also depicted in FIG. 7, as the horizontal line 775, with $\phi_{s1}>T_{s1}$.

At time $t_1$, the high SNR detection score 730 becomes greater than the first stage detection threshold $T_{s1}$, as indicated at the keyword detection point 734. The high SNR detection score 730 can exceed the first stage detection threshold $T_{s1}$ prior to exceeding the threshold $\phi_{s1}$. For instance, the first stage detection threshold $T_{s1}$ can have a value of 40 and the threshold $\phi_{s1}$ can have a higher value, such as 75. A noisy (e.g., relatively low SNR) audio input may be associated with a detection score value that is below the high SNR detection score 730 and may proceed to second stage keyword detection processing. A relatively high SNR audio input may be associated with a detection score value that is above the high SNR detection score 730 and/or above the threshold $\phi_{s1}$, and may skip second stage keyword detection processing if the relatively high SNR detection score value exceeds the threshold $\phi_{s1}$. In some aspects, relatively low SNR audio inputs may be associated with relatively low (or lower) detection score values and relatively high SNR audio inputs may be associated with relatively high (or higher) detection score values.

In some cases, the first stage detection threshold $T_{s1}$ and the threshold $\phi_{s1}$ can be implemented using various values, wherein the value of the threshold $\phi_{s1}$ is greater than the respective value of the first stage detection threshold $T_{s1}$. In the example above in which the first stage detection threshold $T_{s1}$ has a value of 40 and the threshold $\phi_{s1}$ has a value of 75, the second stage keyword detection and the first stage keyword detection may make the same keyword detection decision for audio samples having a detection score greater than 75.

In some examples, the detection thresholds can be given as percentages (e.g., percentages within the interval [0, 100]). In some cases, the detection thresholds may be confidence percentages associated with keyword detection. In some examples, the first stage detection threshold $T_{s1}$ value of 40 can be associated with a 40% detection confidence or detection probability. A greater value associated with a detection threshold (e.g., $T_{s1}$, $\phi_{s1}$, etc.) can be associated with detecting a keyword with greater (e.g., better) confidence.

In some examples, the threshold $\phi_{s1}$ (e.g., also referred to as the second stage detection threshold or the second threshold) can be determined based on the first threshold $T_{s1}$. For instance, as noted previously, the value of the second threshold $\phi_{s1}$ can be determined such that the second threshold is greater than the first threshold $T_{s1}$. In some cases, a value of the second threshold can be determined based on the value of the first threshold. In one illustrative example, the value of the second threshold can be equal to the value of the first threshold plus at least 80% of the value of the first threshold (e.g., $\phi_{s1} \geq 1.8\, T_{s1}$).

In some aspects, one or more of the first threshold Ti and/or the second threshold $\phi_{s1}$ can be determined based on signal-to-noise ratio (SNR) information. For example, the first threshold and/or the second threshold may be determined dynamically as a function of an SNR of one or more audio frames and/or audio samples. Audio data (e.g., audio frames, audio samples, etc.) associated with a relatively high SNR may be utilized to perform keyword detection with greater detection scores or confidence. Audio data associated with a relatively low SNR (e.g., noisy) may be utilized to perform keyword detection with lower detection scores or confidence. In one illustrative example, one or more (or both) of the first threshold and the second threshold can be determined based on one or more SNR measurements associated with audio data (e.g., audio frames, audio samples) being processed by the systems and techniques described herein. For instance, based on keyword detection being associated with greater confidence for high SNR conditions relative to low SNR conditions, the value(s) of the first and/or second thresholds utilized for high SNR audio data can be less than the respective value(s) of the first and/or second thresholds utilized for low SNR audio data. In some cases, an SNR associated with one or more audio samples in the additional audio frames may be greater than an SNR associated with the one or more audio frames in a first audio frame. The SNR associated with an audio frame can be determined as an average of the respective SNR values associated with each audio sample of one or more audio samples in the audio frame. For example, an SNR associated with an audio frame can be the average SNR over the audio samples in the audio frame.

As depicted in the example of FIG. 7, the high SNR detection scores 730 continue to increase after time $t_1$, reaching a peak detection score 738 at a subsequent time $t_2$. The low SNR detection scores 720 are associated with a keyword detection point 724 that is later than time $t_1$ and are shown as increasing to a peak detection score 728 by the subsequent time $t_2$.

In one illustrative example, audio frames processed after a first stage keyword detection (e.g., audio frames processed after the keyword detection point 734 of the high SNR scores 730, audio frames processed after the keyword detection point 724 of the low SNR scores 720, etc.) can be referred to as hangover audio frames, as described above. For instance, the keyword detection points 734 and 724 can be identified based on using the keyword detection first stage 610 of FIG. 6 to determine that the respective keyword detection score $>T_{s1}$. The subsequent, hangover audio frames can be processed by the keyword detection first stage 610 of FIG. 6 and the respective keyword detection scores (e.g., generated by the keyword detection first stage 610) can be analyzed against the threshold $\phi_{s1}$ using the detection confidence analysis stage 615 of FIG. 6.

In some aspects, the detection confidence analysis stage 615 can compare the respective fist stage keyword detection score for each hangover frame to the threshold $\phi_{s1}$. If the first stage keyword detection score does not exceed the threshold $\phi_{s1}$, the detection confidence analysis stage 615 can further determine if the first stage keyword detection score for the current frame has increased relative to one or more previously processed hangover frames. In one illustrative example, hangover audio frame processing using detection confidence analysis stage 615 and the threshold $\phi_{s1}$ can be performed until either a hangover frame is identified as having a first stage keyword detection score $>\phi_{s1}$ (e.g., in which case the keyword processing second stage 620 can be skipped and audio processing proceeds to post-processing stage 630) or until a peak detection score is reached (e.g., the detection score for the current frame begins to decrease relative to the detection scores of previous frames).

For example, the high SNR detection scores 730 exceed the threshold $\phi_{s1}$ at a subsequent keyword detection point 736 that occurs prior to the peak detection score 738. In this example, keyword detection for the high SNR audio sample associated with the scores 730 can be confirmed at the keyword detection point 736 and second stage keyword processing can be skipped. For example, at the subsequent keyword detection point 736, the detection confidence analysis stage 615 can exit, the keyword detection second stage 620 can be skipped, and the audio sample proceeds directly to the post-processing stage 630 of FIG. 6 can be triggered for the high SNR audio sample associated with the detection scores 730 (e.g., without waiting for the peak detection score to be reached at 738).

The low SNR detection scores 720 initially exceed the first stage detection threshold $T_{s1}$ at the detection point 724. Hangover frames processed by the detection confidence analysis stage 615 have increasing keyword detection scores that increase up to the peak detection score 728 at time $t_2$.

However, the low SNR detection scores 720 determined for the hangover frames do not ever exceed the threshold $\phi_{s1}$. Based on detecting the peak detection score 728 without the low SNR scores 720 having exceeded the threshold $\phi_{s1}$, the detection confidence analysis stage 615 can exit and proceed to second stage keyword processing (e.g., the 'No' option depicted in FIG. 6 between the detection confidence analysis stage 615 and the keyword detection stage 620).

As mentioned previously, the threshold $\phi_{s1}$ for skipping second stage keyword detection processing can be greater than the first stage keyword detection threshold $T_{s1}$. The threshold $\phi_{s1}$ can be determined such that second stage keyword detection processing always makes the same detection as first stage keyword detection processing for the given value of threshold $\phi_{s1}$. For instance, the threshold $\phi_{s1}$ can be determined as the first stage detection score value at which second stage keyword detection processing is seen to obtain 100% agreement with the first stage (e.g., among various other agreement percentages). In some examples, such as in clean or high SNR conditions associated with obtaining an input audio sample provided to the presently disclosed multi-stage keyword detection system(s), the first stage keyword detection score may be sufficiently high so as to exceed the threshold $\phi_{s1}$ for skipping second stage keyword detection processing. In other example, such as when a user accent fits well with a keyword detection model used to implement the first stage processing, the first stage keyword detection score may additionally be seen to be sufficiently high so as to exceed the threshold $\phi_{s1}$ for skipping second stage keyword detection processing.

In some aspects, the threshold $\phi_{s1}$ for skipping second stage keyword detection processing can be determined based on offline simulations, on-target computation, and/or using one or more machine learning models, as will be described in turn below.

For instance, the threshold $\phi_{s1}$ can be determined based on offline simulations using a sufficiently large dataset that covers different noise and SNR conditions associated with detecting one or more particular keywords. In one illustrative example, detection scores can be determined or otherwise monitored for a keyword detection first stage (e.g., first stage 610 of FIG. 6) and a keyword detection second stage (e.g., second stage 620 of FIG. 6). For example, first and second stage keyword detection scores can be obtained for a set of N different keyword detection examples, obtained over different noise and SNR conditions. Of the N different keyword detection examples, $\phi_{s1}$ can be determined as the first stage detection score that corresponds to a pre-determined agreement percentage at the second keyword detection stage. For instance, $\phi_{s1}$ may be determined as the first stage detection score value that corresponds to 100% agreement at the second keyword detection stage. In other examples, $\phi_{s1}$ may be determined as the first stage detection score value that corresponds to 99% agreement at the second keyword detection stage, 95% agreement at the second keyword detection stage, etc. In one illustrative example, $\phi_{s1}$ can be determined such that $D_{s1}=D_{s2}$ for x*N keyword detection examples in the given data set. Here, $D_{s1}$ represents the keyword detection decision of the first stage, $D_{s2}$ represents the keyword detection decision of the second stage, and x represents a pre-determined agreement percentage between the first and second stage keyword detection decisions (e.g., for 100% agreement, x=1; for 99% agreement x=0.99; etc.).

In another illustrative example, the threshold $\phi_{s1}$ for skipping second stage keyword detection processing can be determined based on on-target computation. For instance, the dataset of N different keyword detection examples described above can be obtained by logging the first stage keyword detection scores and the second stage keyword detection scores for various keyword detections performed using a particular device (e.g., the particular device that implements the presently disclosed systems and techniques for multi-stage keyword detection with dynamically skippable stages). In such examples, the multi-stage keyword detection system can be initialized without a value for the threshold $\phi_{s1}$, with the value for threshold $\phi_{s1}$ being determined at a later time, after the data set of N different keyword detection examples has been accumulated or otherwise obtained.

In another illustrative example, the threshold $\phi_{s1}$ for skipping second stage keyword detection processing can be determined using one or more machine learning models. The machine learning model(s) can be used to determine the threshold $\phi_{s1}$ offline, can be used to determine the threshold $\phi_{s1}$ on-target (e.g., on a device implementing the multi-stage keyword detection with dynamically skippable stages), and/or a combination of the two. For example, a machine learning model can be implemented on-target and may run periodically to compute a value for the threshold $\phi_{s1}$ for skipping second stage keyword detection processing.

In some aspects, the systems and techniques can implement a voice activity detection (VAD) and/or audio context detection (ACD) machine learning model to determine additional classification information of an input audio sample that is provided to the multi-stage keyword detection system. For instance, a VAD or ACD model can be used to classify the input audio sample (or audio frames thereof) as speech or noise (or other non-speech audio signal). The speech or noise classification information can be provided as an additional input to a multi-stage keyword detection system and used to dynamically determine whether one or more additional keyword detection stages can be skipped. For example, speech or noise classification information can be used in combination with a first stage detection score information (e.g., as described above) to jointly determine whether a second stage of the multi-stage keyword detection system can be dynamically skipped.

Figure 8:
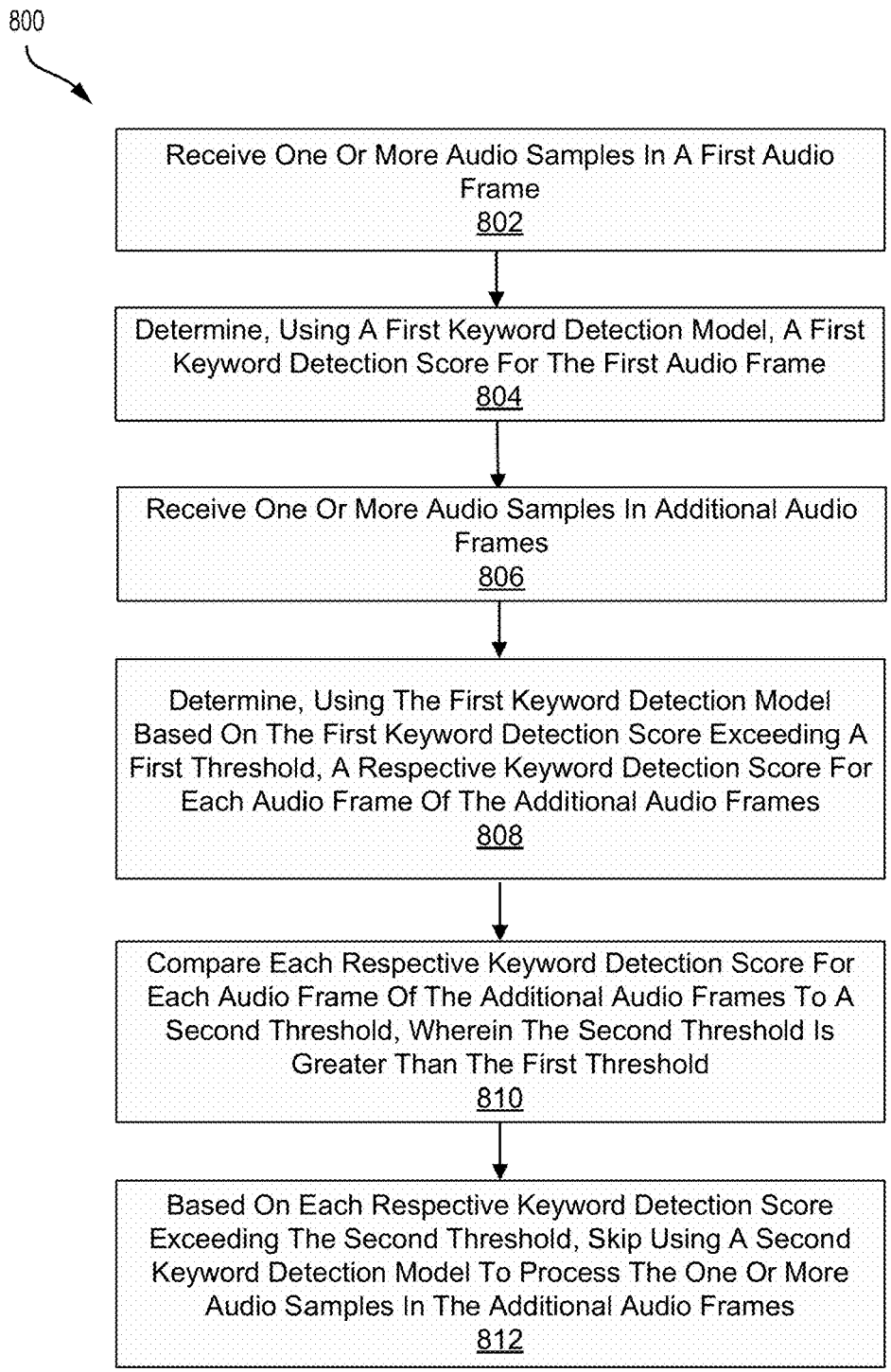
FIG. 8 is a flow chart illustrating an example of a process for processing one or more audio samples, in accordance with some examples.

FIG. 8 is a block diagram illustrating a process 800 for processing one or more audio samples. Although the example process 800 depicts a particular sequence of operations, the sequence may be altered without departing from the scope of the present disclosure. For example, some of the operations depicted may be performed in parallel or in a different sequence that does not materially affect the function of the process 800. In other examples, different components of an example device or system that implements the process 800 may perform functions at substantially the same time or in a specific sequence.

At block 802, the process 800 includes receiving one or more audio samples in a first audio frame. For example, the one or more audio samples in the first audio frame can be received using one or more of the sensors 114 of FIG. 1, the DSP 106 of FIG. 1, the connectivity 110 of FIG. 1, and/or the multimedia processor 112 of FIG. 1. In some examples, the one or more audio samples in the first audio frame can be received from the audio source 202 of FIG. 2. In some cases, the one or more audio samples in the first audio frame can be received using the audio signal of FIG. 3. In some cases, the one or more audio samples in the first audio frame can be received in the input data 552 of FIG. 5. In some examples, the one or more audio samples in the first audio frame can be received using the audio source 602 of FIG. 6.

IN some examples, the one or more audio samples in the first audio frame can be received using the audio data 702 of FIG. 7.

At block 804, the process 800 includes determining, using a first keyword detection model, first keyword detection score for the first audio frame. For example, the first keyword detection model can be the same as or similar to the keyword detection model 212 included in the keyword detection first stage 200 of FIG. 2. In some examples, the first keyword detection model can be included in the keyword detection first stage 610 of FIG. 6. In some cases, the first keyword detection model is included in a first keyword detection stage of a multi-stage keyword detection system, such as the multi-stage keyword detection system of FIG. 2 and/or the multi-stage keyword detection system 600 of FIG. 6. In some cases, the multi-stage keyword detection system is a two-stage keyword detection system.

At block 806, the process 800 includes receiving one or more additional audio samples in additional audio frames. In some cases, the additional audio frames and the first audio frame can be included in an audio data, wherein the additional audio frames are subsequent to the first audio frame. For example, the additional audio frames and the first audio frame can be included in the audio data 702 of FIG. 7, wherein the additional audio frames are subsequent to the first audio frame. In some cases, the additional audio frames comprise one or more hangover audio frames, each hangover audio frame subsequent to the first audio frame and having a respective keyword detection score exceeding the first threshold. For example, each hangover audio frame can be subsequent to the first audio frame and can have a respective keyword detection score exceeding the first threshold $T_{s1}$ 740 of FIG. 7.

At block 808, the process 800 includes determining, using the first keyword detection model based on the first keyword detection score exceeding a first threshold, a respective keyword detection score for each audio frame of the additional audio frames. For example, the first threshold can be the same as or similar to the first threshold $T_{s1}$ 740 depicted in FIG. 7. In some cases, the first threshold is a keyword detection threshold associated with a keyword detection first stage, and wherein the keyword detection first stage implements the first keyword detection model. For example, the first threshold can be a keyword detection threshold associated with the keyword detection first stage 200 of FIG. 2 and/or the keyword detection first stage 610 of FIG. 6.

At block 810, the process 800 includes comparing each respective keyword detection score for each audio frame of the additional audio frames to a second threshold, wherein the second threshold is greater than the first threshold. For example, the second threshold can be the same as or similar to the threshold $\phi_{s1}$ 775 of FIG. 7. In some cases, the second threshold can be determined based on a plurality of keyword detection scores determined using the first keyword detection model and a corresponding plurality of keyword detection scores determined using the second keyword detection model. For instance, the second threshold can be determined as a keyword detection score of the first keyword detection model associated with a pre-determined agreement percentage between the first keyword detection model and the second keyword detection model. In some cases, the second keyword detection model can be implemented by a keyword detection second stage that is the same as or similar to the keyword detection second stage 214 of FIG. 2 and/or the keyword detection second stage 620 of FIG. 6.

In some examples, the pre-determined agreement percentage is 100%, wherein each keyword detection score determined using the first keyword detection model and exceeding the second threshold is indicative of keyword detection agreement between the first keyword detection model and the second keyword detection model.

At block 812, the process 800 includes, based on each respective keyword detection score exceeding the second threshold, skipping using a second keyword detection model to process the one or more audio samples in the additional audio frames. For example, as noted above, the second keyword detection model can be implemented by a keyword detection second stage that is the same as or similar to the keyword detection second stage 214 of FIG. 2 and/or the keyword detection second stage 620 of FIG. 6.

In some cases, the process 800 includes determining a keyword is detected for the one or more audio samples in the additional audio frames based on the respective keyword detection score exceeding the second threshold. In some cases, one or more audio samples in the additional audio frames can be provided to a post-processing stage of a keyword detection system based on the respective keyword detection score exceeding the second threshold. For example, one or more audio samples in the additional audio frames can be provided to the post-processing 630 included in the keyword detection system 600 of FIG. 6, based on the respective keyword detection score exceeding the second threshold.

In some cases, the first keyword detection model is included in a first keyword detection stage of a multi-stage keyword detection system and the second keyword detection model is included in a second keyword detection stage of the multi-stage keyword detection system. For instance, the first keyword detection model can be included in the first keyword detection stage 610 of multi-stage keyword detection system 600 of FIG. 6 and the second keyword detection model can be included in the second keyword detection stage 620 of the multi-stage keyword detection system 600 of FIG. 6. In some cases, the multi-stage keyword detection system can be a two-stage keyword detection system, the same as or similar to the two-stage keyword detection system 600 of FIG. 6.

In some cases, skipping using the second keyword detection model to process the one or more audio samples in the additional audio frames comprises classifying, using a machine learning model, the additional audio frames as including speech audio signals or as including non-speech audio signals. Based on classifying the additional audio frames as including speech audio signals, the process 800 can skip using the second keyword detection model to process the one or more audio samples in the additional audio frames. The one or more audio samples in the additional audio frames can be provided to a post-processing stage of a keyword detection system based on the respective keyword detection score exceeding the second threshold. For example, the one or more audio samples in the additional audio frames can be provided to the post-processing stage 630 of the keyword detection system 600 of FIG. 6 based on the respective keyword detection score exceeding the second threshold.

In some cases, the process 800 can include classifying the additional audio frames as including speech audio signals or as including non-speech audio signals using a deep neural network voice activity detection (DNN-VAD) machine learning model. In some examples, the additional audio frames can be classified as including speech audio signals or as including non-speech audio signals using an audio context detection (ACD) machine learning model. In some cases, the process 800 can include skipping using the second keyword detection model to process the one or more audio samples in the additional audio frames and skipping using the post-processing stage to process the one or more audio samples in the additional audio frames, based on classifying the additional audio frames as including non-speech audio signals.

In some aspects, the processes described herein (e.g., the process 800 and/or any other process described herein) may be performed by a computing device or apparatus. In one example, the process 800 and/or other technique or process described herein can be performed by the system of FIG. 6. In another example, the process 800 and/or other technique or process described herein can be performed by the computing system 900 shown in FIG. 9. For instance, a computing device with the computing device architecture of the computing system 900 shown in FIG. 9 can implement the operations of the process 800, and/or can implement one or more of the components and/or operations described herein with respect to any of FIGS. 1 through 7.

The computing device can include any suitable device, such as a mobile device (e.g., a mobile phone), an extended reality (XR) device (e.g., a virtual reality (VR), augmented reality (AR), or mixed reality (MR) headset, AR or MR glasses, etc.), a wearable device (e.g., network-connected watch or other wearable device), a vehicle (e.g., an autonomous or semi-autonomous vehicle) or computing system or device of the vehicle, a desktop computing device, a tablet computing device, a server computer, a robotic device, a laptop computer, a network-connected television, a camera, and/or any other computing device with the resource capabilities to perform the processes described herein, including the process 800, the process 800, and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 800 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
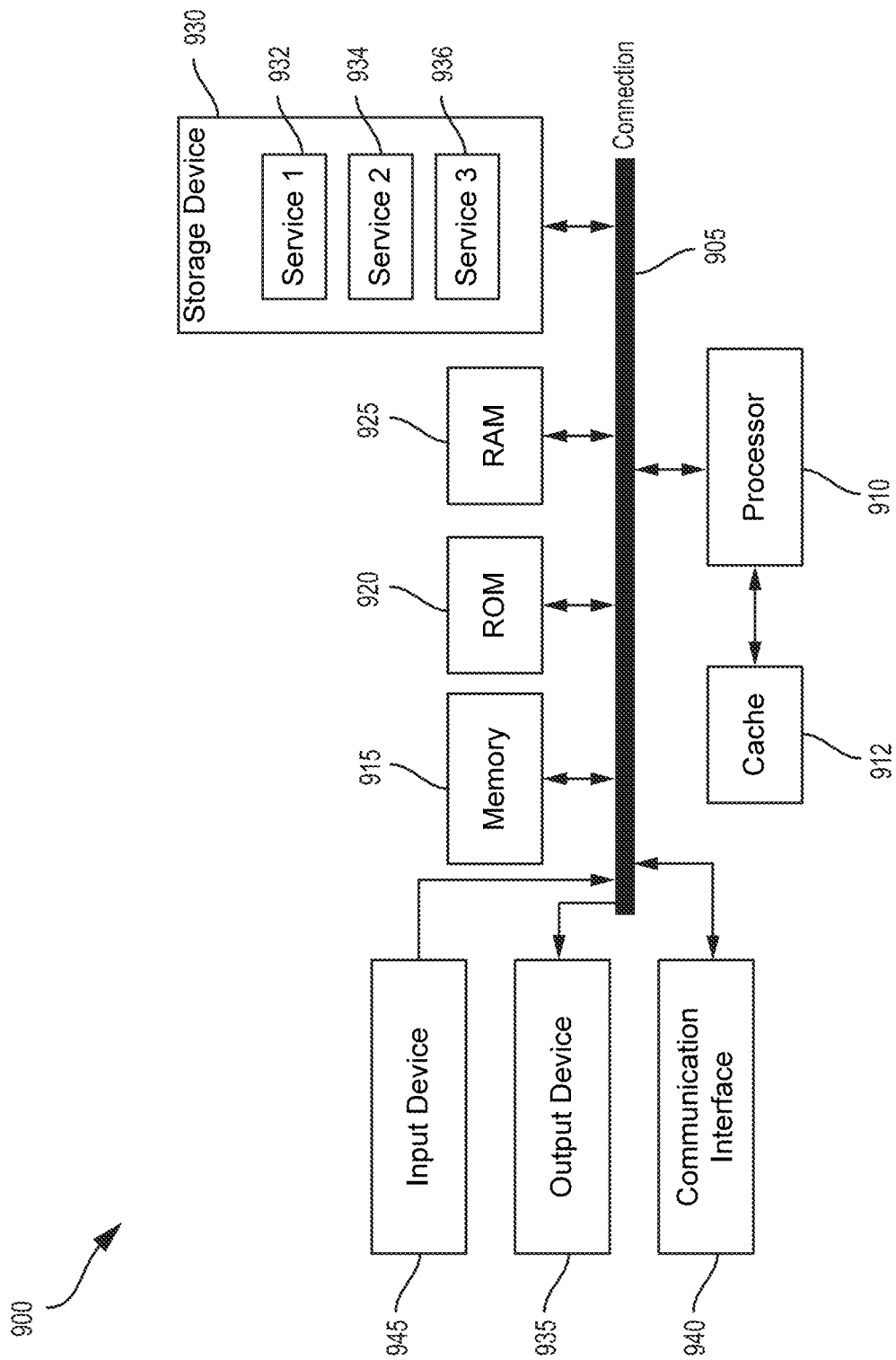
FIG. 9 is block diagram illustrating an example of a computing system for implementing certain aspects described herein.

FIG. 9 shows an example of computing system 900, which can implement the various techniques described herein. The components of the computing system 900 are in communication with each other using connection 905. Connection 905 can be a physical connection via a bus, or a direct connection into processor 910, such as in a chipset architecture. Connection 905 can also be a virtual connection, networked connection, or logical connection.

In some cases, computing system 900 is a distributed system in which the functions described in this disclosure can be distributed within a datacenter, multiple data centers, a peer network, etc. In some aspects, one or more of the described system components represents many such components each performing some or all of the function for which the component is described. In some examples, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache of high-speed memory 912 connected directly with, in close proximity to, or integrated as part of processor 910. In some cases, the computing system 900 can copy data from memory 915 and/or the storage device 930 to the cache 912 for quick access by processor 910. In this way, the cache can provide a performance enhancement that avoids processor 910 delays while waiting for data. These and other modules can control or be configured to control processor 910 to perform various actions. Other computing device memory 915 may be available for use as well. Memory 915 can include multiple different types of memory with different performance characteristics.

Processor 910 can include any general purpose processor and a hardware service or software service, such as a service 1 932, a service 2 934, and a service 3 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art, such as a display, projector, television, speaker device, etc. In some instances, multimodal systems can enable a user to provide multiple types of input/output to communicate with computing system 900. Computing system 900 can include communication interface 940, which can generally govern and manage the user input and system output. The communication interface may perform or facilitate receipt and/or transmission of wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.9 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communication interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc optical disc, a holographic optical disk, another optical medium, a secure digital (SD) card, a micro secure digital (microSD) card, a Memory Stick® card, a smartcard chip, a Europay Mastercard and Visa (EMV) chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 930 can include software services (e.g., service 1 932, service 2 934, and service 3 936, and/or other services), servers, services, etc., that when the code that defines such software is executed by the processor 910, it causes the system to perform a function. In some aspects, a hardware service that performs a particular function can include the software component stored in a computer-readable medium in connection with the necessary hardware components, such as processor 910, connection 905, output device 935, etc., to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects and examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects and examples in unnecessary detail. In other instances, well-known circuits, processes, algorithms, structures, and techniques may be shown without unnecessary detail in order to avoid obscuring the aspects and examples.

Individual aspects and examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects and examples thereof, but those skilled in the art will recognize that the application is not limited thereto. Thus, while illustrative aspects and examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects and examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects and examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for processing one or more audio samples, comprising: at least one memory; and at least one processor coupled to the at least one memory, the at least one processor configured to: receive one or more audio samples in a first audio frame; determine, using a first keyword detection model, a first keyword detection score for the first audio frame; receive one or more audio samples in additional audio frames; determine, using the first keyword detection model based on the first keyword detection score exceeding a first threshold, a respective keyword detection score for each audio frame of the additional audio frames; compare the respective keyword detection score for each audio frame of the additional audio frames to a second threshold, wherein the second threshold is greater than the first threshold; and based on the respective keyword detection score exceeding the second threshold, skip using a second keyword detection model to process the first audio frame and the additional audio frames.

Aspect 2. The apparatus of Aspect 1, wherein the at least one processor is further configured to: determine a keyword is detected for the one or more audio samples in the additional audio frames based on the respective keyword detection score exceeding the second threshold.

Aspect 3. The apparatus of Aspect 2, wherein the at least one processor is further configured to: provide one or more audio samples in the additional audio frames to a post-processing stage of a keyword detection system based on the respective keyword detection score exceeding the second threshold.

Aspect 4. The apparatus of any of Aspects 1 to 3, wherein: the first keyword detection model is included in a first keyword detection stage of a multi-stage keyword detection system; and the second keyword detection model is included in a second keyword detection stage of the multi-stage keyword detection system.

Aspect 5. The apparatus of Aspect 4, wherein the multi-stage keyword detection system is a two-stage keyword detection system.

Aspect 6. The apparatus of any of Aspects 1 to 5, wherein the additional audio frames and the first audio frame are included in an audio data, and wherein the additional audio frames are subsequent to the first audio frame.

Aspect 7. The apparatus of any of Aspects 1 to 6, wherein the additional audio frames comprise one or more hangover audio frames, each hangover audio frame subsequent to the first audio frame and having a respective keyword detection score exceeding the first threshold.

Aspect 8. The apparatus of any of Aspects 1 to 7, wherein the first threshold is a keyword detection threshold associated with a keyword detection first stage, and wherein the keyword detection first stage implements the first keyword detection model.

Aspect 9. The apparatus of any of Aspects 1 to 8, wherein, to skip using the second keyword detection model to process the one or more audio samples in the additional audio frames, the at least one processor is configured to: classify, using a machine learning model, the additional audio frames as including speech audio signals or as including non-speech audio signals; based on classifying the additional audio frames as including speech audio signals, skip using the second keyword detection model to process the one or more audio samples in the additional audio frames; and provide the one or more audio samples in the additional audio frames to a post-processing stage of a keyword detection system based on the respective keyword detection score exceeding the second threshold.

Aspect 10. The apparatus of Aspect 9, wherein the at least one processor is configured to classify the additional audio frames as including speech audio signals or as including non-speech audio signals using a deep neural network voice activity detection (DNN-VAD) machine learning model.

Aspect 11. The apparatus of any of Aspects 9 to 10, wherein the at least one processor is configured to classify the additional audio frames as including speech audio signals or as including non-speech audio signals using an audio context detection (ACD) machine learning model.

Aspect 12. The apparatus of any of Aspects 9 to 11, wherein the at least one processor is configured to: skip using the second keyword detection model to process the one or more audio samples in the additional audio frames and skip using the post-processing stage to process the one or more audio samples in the additional audio frames based on classifying the additional audio frames as including non-speech audio signals.

Aspect 13. The apparatus of any of Aspects 1 to 12, wherein the at least one processor is further configured to: determine the second threshold based on a plurality of keyword detection scores determined using the first keyword detection model and a corresponding plurality of keyword detection scores determined using the second keyword detection model.

Aspect 14. The apparatus of Aspect 13, wherein the at least one processor is further configured to: determine the second threshold as a keyword detection score of the first keyword detection model associated with a pre-determined agreement percentage between the first keyword detection model and the second keyword detection model.

Aspect 15. The apparatus of Aspect 14, wherein the pre-determined agreement percentage is 100%, wherein each keyword detection score determined using the first keyword detection model and exceeding the second threshold is indicative of keyword detection agreement between the first keyword detection model and the second keyword detection model.

Aspect 16. A method for processing one or more audio samples, comprising: receiving one or more audio samples in a first audio frame; determining, using a first keyword detection model, a first keyword detection score for the first audio frame; receiving one or more audio samples in additional audio frames; determining, using the first keyword detection model based on the first keyword detection score exceeding a first threshold, a respective keyword detection score for each audio frame of the additional audio frames; comparing the respective keyword detection score for each audio frame of the additional audio frames to a second threshold, wherein the second threshold is greater than the first threshold; and based on the respective keyword detection score exceeding the second threshold, skipping using a second keyword detection model to process the first audio sample and the additional audio frames.

Aspect 17. The method of Aspect 16, further comprising: determining a keyword is detected for the one or more audio samples in the additional audio frames based on the respective keyword detection score exceeding the second threshold.

Aspect 18. The method of Aspect 17, further comprising: providing one or more audio samples in the additional audio frames to a post-processing stage of a keyword detection system based on the respective keyword detection score exceeding the second threshold.

Aspect 19. The method of any of Aspects 16 to 18, wherein: the first keyword detection model is included in a first keyword detection stage of a multi-stage keyword detection system; and the second keyword detection model is included in a second keyword detection stage of the multi-stage keyword detection system.

Aspect 20. The method of Aspect 19, wherein the multi-stage keyword detection system is a two-stage keyword detection system.

Aspect 21. The method of any of Aspects 16 to 20, wherein the additional audio frames and the first audio frame are included in an audio data, and wherein the additional audio frames are subsequent to the first audio frame.

Aspect 22. The method of any of Aspects 16 to 21, wherein the additional audio frames comprise one or more hangover audio frames, each hangover audio frame subsequent to the first audio frame and having a respective keyword detection score exceeding the first threshold.

Aspect 23. The method of any of Aspects 16 to 22, wherein the first threshold is a keyword detection threshold associated with a keyword detection first stage, and wherein the keyword detection first stage implements the first keyword detection model.

Aspect 24. The method of any of Aspects 16 to 23, wherein skipping using the second keyword detection model to process the one or more audio samples in the additional audio frames comprises: classifying, using a machine learning model, the additional audio frames as including speech audio signals or as including non-speech audio signals; based on classifying the additional audio frames as including speech audio signals, skipping using the second keyword detection model to process the one or more audio samples in the additional audio frames; and providing the one or more audio samples in the additional audio frames to a post-processing stage of a keyword detection system based on the respective keyword detection score exceeding the second threshold.

Aspect 25. The method of Aspect 24, further comprising: classifying the additional audio frames as including speech audio signals or as including non-speech audio signals using a deep neural network voice activity detection (DNN-VAD) machine learning model.

Aspect 26. The method of any of Aspects 24 to 25, further comprising: classifying the additional audio frames as including speech audio signals or as including non-speech audio signals using an audio context detection (ACD) machine learning model.

Aspect 27. The method of any of Aspects 24 to 26, further comprising: skipping using the second keyword detection model to process the one or more audio samples in the additional audio frames and skipping using the post-processing stage to process the one or more audio samples in the additional audio frames based on classifying the additional audio frames as including non-speech audio signals.

Aspect 28. The method of any of Aspects 16 to 27, further comprising: determining the second threshold based on a plurality of keyword detection scores determined using the first keyword detection model and a corresponding plurality of keyword detection scores determined using the second keyword detection model.

Aspect 29. The method of Aspect 28, further comprising: determining the second threshold as a keyword detection score of the first keyword detection model associated with a pre-determined agreement percentage between the first keyword detection model and the second keyword detection model.

Aspect 30. The method of Aspect 29, wherein the pre-determined agreement percentage is 100%, wherein each keyword detection score determined using the first keyword detection model and exceeding the second threshold is indicative of keyword detection agreement between the first keyword detection model and the second keyword detection model.

Aspect 31. A non-transitory computer-readable medium including instructions which, when executed by one or more processors, cause the one or more processors to perform operations according to any of Aspects 1 to 15.

Aspect 32. A non-transitory computer-readable medium including instructions which, when executed by one or more processors, cause the one or more processors to perform operations according to any of Aspects 16 to 30.

Aspect 33. An apparatus comprising one or more means for performing operations according to any of Aspects 1 to 15.

Aspect 34. An apparatus comprising one or more means for performing operations according to any of Aspects 16 to 30.

Aspect 35. The apparatus of any of Aspects 1 to 15, wherein the second threshold is equal to the first threshold plus at least 80% of the first threshold.

Aspect 36. The apparatus of any of Aspects 1 to 15 or 36, wherein a first signal-to-noise ratio (SNR) associated with the one or more audio samples in the additional audio frames is greater than a second SNR associated with the one or more audio samples in the first audio frame.

Aspect 37. The apparatus of Aspect 36, wherein: the first SNR is an average of a respective SNR associated with each audio sample of the one or more audio samples in the additional audio frames; and the second SNR is an average of a respective SNR associated with each audio sample of the one or more audio samples in the first audio frame.

Aspect 38. The apparatus of any of Aspects 1 to 15 or 35 to 37, wherein the at least one processor is configured to: determine a value of the second threshold based on a value of the first threshold and a signal-to-noise ratio (SNR) associated with the additional audio frames.

Aspect 39. A non-transitory computer-readable medium including instructions which, when executed by one or more processors, cause the one or more processors to perform operations according to any of Aspects 35 to 38.

Aspect 40. An apparatus comprising one or more means for performing operations according to any of Aspects 35 to 38.

Aspect 41. The method of any of Aspects 16 to 30, wherein the second threshold is equal to the first threshold plus at least 80% of the first threshold.

Aspect 42. The method of any of Aspects 16 to 30 or 41, wherein a first signal-to-noise ratio (SNR) associated with the one or more audio samples in the additional audio frames is greater than a second SNR associated with the one or more audio samples in the first audio frame.

Aspect 43. The method of Aspect 42, wherein: the first SNR is an average of a respective SNR associated with each audio sample of the one or more audio samples in the additional audio frames; and the second SNR is an average of a respective SNR associated with each audio sample of the one or more audio samples in the first audio frame.

Aspect 44. The method of any of Aspects 16 to 30 or 41 to 43, wherein the at least one processor is configured to: determine a value of the second threshold based on a value of the first threshold and a signal-to-noise ratio (SNR) associated with the additional audio frames.

Aspect 45. A non-transitory computer-readable medium including instructions which, when executed by one or more processors, cause the one or more processors to perform operations according to any of Aspects 41 to 44.

Aspect 46. An apparatus comprising one or more means for performing operations according to any of Aspects 41 to 44.

What is claimed is:

1. An apparatus for processing one or more audio samples, comprising:
   at least one memory; and
   at least one processor coupled to the at least one memory, the at least one processor configured to:
      receive one or more audio samples in a first audio frame;
      determine, using a first keyword detection model, a first keyword detection score for the first audio frame;
      receive one or more audio samples in additional audio frames;
      determine, using the first keyword detection model based on the first keyword detection score exceeding a first threshold, a respective keyword detection score for each audio frame of the additional audio frames;
      compare the respective keyword detection score for each audio frame of the additional audio frames to a second threshold, wherein the second threshold is greater than the first threshold; and
      based on the respective keyword detection score exceeding the second threshold, skip using a second keyword detection model to process the first audio frame and the additional audio frames.

2. The apparatus of claim 1, wherein the at least one processor is further configured to:
   determine a keyword is detected for the one or more audio samples in the additional audio frames based on the respective keyword detection score exceeding the second threshold.

3. The apparatus of claim 2, wherein the at least one processor is further configured to:
   provide one or more audio samples in the additional audio frames to a post-processing stage of a keyword detection system based on the respective keyword detection score exceeding the second threshold.

4. The apparatus of claim 1, wherein:
   the first keyword detection model is included in a first keyword detection stage of a multi-stage keyword detection system; and
   the second keyword detection model is included in a second keyword detection stage of the multi-stage keyword detection system.

5. The apparatus of claim 4, wherein the multi-stage keyword detection system is a two-stage keyword detection system.

6. The apparatus of claim 1, wherein the additional audio frames and the first audio frame are included in an audio data, and wherein the additional audio frames are subsequent to the first audio frame.

7. The apparatus of claim 1, wherein the additional audio frames comprise one or more hangover audio frames, each hangover audio frame subsequent to the first audio frame and having a respective keyword detection score exceeding the first threshold.

8. The apparatus of claim 1, wherein the first threshold is a keyword detection threshold associated with a keyword detection first stage, and wherein the keyword detection first stage implements the first keyword detection model.

9. The apparatus of claim 1, wherein, to skip using the second keyword detection model to process the one or more audio samples in the additional audio frames, the at least one processor is configured to:
   classify, using a machine learning model, the additional audio frames as including speech audio signals or as including non-speech audio signals;
   based on classifying the additional audio frames as including speech audio signals, skip using the second keyword detection model to process the one or more audio samples in the additional audio frames; and
   provide the one or more audio samples in the additional audio frames to a post-processing stage of a keyword detection system based on the respective keyword detection score exceeding the second threshold.

10. The apparatus of claim 9, wherein the at least one processor is configured to classify the additional audio frames as including speech audio signals or as including non-speech audio signals using a deep neural network voice activity detection (DNN-VAD) machine learning model.

11. The apparatus of claim 9, wherein the at least one processor is configured to classify the additional audio frames as including speech audio signals or as including non-speech audio signals using an audio context detection (ACD) machine learning model.

12. The apparatus of claim 9, wherein the at least one processor is configured to:
   skip using the second keyword detection model to process the one or more audio samples in the additional audio frames and skip using the post-processing stage to process the one or more audio samples in the additional audio frames based on classifying the additional audio frames as including non-speech audio signals.

13. The apparatus of claim 1, wherein the at least one processor is further configured to:
determine the second threshold based on a plurality of keyword detection scores determined using the first keyword detection model and a corresponding plurality of keyword detection scores determined using the second keyword detection model.

14. The apparatus of claim 13, wherein the at least one processor is further configured to:
determine the second threshold as a keyword detection score of the first keyword detection model associated with a pre-determined agreement percentage between the first keyword detection model and the second keyword detection model.

15. The apparatus of claim 14, wherein the pre-determined agreement percentage is 100%, wherein each keyword detection score determined using the first keyword detection model and exceeding the second threshold is indicative of keyword detection agreement between the first keyword detection model and the second keyword detection model.

16. The apparatus of claim 1, wherein the second threshold is equal to the first threshold plus at least 80% of the first threshold.

17. The apparatus of claim 1, wherein a first signal-to-noise ratio (SNR) associated with the one or more audio samples in the additional audio frames is greater than a second SNR associated with the one or more audio samples in the first audio frame.

18. The apparatus of claim 17, wherein:
the first SNR is an average of a respective SNR associated with each audio sample of the one or more audio samples in the additional audio frames; and
the second SNR is an average of a respective SNR associated with each audio sample of the one or more audio samples in the first audio frame.

19. The apparatus of claim 1, wherein the at least one processor is configured to:
determine a value of the second threshold based on a value of the first threshold and a signal-to-noise ratio (SNR) associated with the additional audio frames.

20. A method for processing one or more audio samples, comprising:
receiving one or more audio samples in a first audio frame;
determining, using a first keyword detection model, a first keyword detection score for the first audio frame;
receiving one or more audio samples in additional audio frames;
determining, using the first keyword detection model based on the first keyword detection score exceeding a first threshold, a respective keyword detection score for each audio frame of the additional audio frames;
comparing the respective keyword detection score for each audio frame of the additional audio frames to a second threshold, wherein the second threshold is greater than the first threshold; and
based on the respective keyword detection score exceeding the second threshold, skipping using a second keyword detection model to process the first audio frame and the additional audio frames.

21. The method of claim 20, further comprising:
determining a keyword is detected for the one or more audio samples in the additional audio frames based on the respective keyword detection score exceeding the second threshold.

22. The method of claim 21, further comprising:
providing one or more audio samples in the additional audio frames to a post-processing stage of a keyword detection system based on the respective keyword detection score exceeding the second threshold.

23. The method of claim 20, wherein:
the first keyword detection model is included in a first keyword detection stage of a multi-stage keyword detection system; and
the second keyword detection model is included in a second keyword detection stage of the multi-stage keyword detection system.

24. The method of claim 20, wherein the additional audio frames and the first audio frame are included in an audio data, and wherein the additional audio frames are subsequent to the first audio frame.

25. The method of claim 20, wherein the additional audio frames comprise one or more hangover audio frames, each hangover audio frame subsequent to the first audio frame and having a respective keyword detection score exceeding the first threshold.

26. The method of claim 20, wherein skipping using the second keyword detection model to process the one or more audio samples in the additional audio frames comprises:
classifying, using a machine learning model, the additional audio frames as including speech audio signals or as including non-speech audio signals;
based on classifying the additional audio frames as including speech audio signals, skipping using the second keyword detection model to process the one or more audio samples in the additional audio frames; and
providing the one or more audio samples in the additional audio frames to a post-processing stage of a keyword detection system based on the respective keyword detection score exceeding the second threshold.

27. The method of claim 26, further comprising:
classifying the additional audio frames as including speech audio signals or as including non-speech audio signals using a deep neural network voice activity detection (DNN-VAD) machine learning model or an audio context detection (ACD) machine learning model.

28. The method of claim 26, further comprising:
skipping using the second keyword detection model to process the one or more audio samples in the additional audio frames and skipping using the post-processing stage to process the one or more audio samples in the additional audio frames based on classifying the additional audio frames as including non-speech audio signals.

29. The method of claim 20, further comprising:
determining the second threshold based on a plurality of keyword detection scores determined using the first keyword detection model and a corresponding plurality of keyword detection scores determined using the second keyword detection model.

30. The method of claim 29, further comprising:
determining the second threshold as a keyword detection score of the first keyword detection model associated with a pre-determined agreement percentage between the first keyword detection model and the second keyword detection model.

* * * * *